(12) United States Patent
Sugawara

(10) Patent No.: US 10,809,489 B2
(45) Date of Patent: Oct. 20, 2020

(54) LENS DRIVING DEVICE, CAMERA MODULE, AND CAMERA-MOUNTED DEVICE

(71) Applicant: Masayoshi Sugawara, Tokyo (JP)

(72) Inventor: Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 89 days.

(21) Appl. No.: 16/234,633

(22) Filed: Dec. 28, 2018

(65) Prior Publication Data

US 2019/0204531 A1   Jul. 4, 2019

(30) Foreign Application Priority Data

Dec. 28, 2017   (JP) .................. 2017-254222

(51) Int. Cl.
*G02B 7/02* (2006.01)
*G02B 7/09* (2006.01)
(Continued)

(52) U.S. Cl.
CPC .............. *G02B 7/09* (2013.01); *G02B 27/646* (2013.01); *G03B 5/02* (2013.01); *G03B 5/06* (2013.01);
(Continued)

(58) Field of Classification Search
CPC ........ G02B 7/09; G02B 27/646; G02B 7/102; G02B 7/04; G02B 27/642; G02B 27/644;
(Continued)

(56) References Cited

U.S. PATENT DOCUMENTS

2016/0320584 A1   11/2016 Lee et al.
2017/0115466 A1   4/2017 Murakami et al.
(Continued)

FOREIGN PATENT DOCUMENTS

JP   2012177753 A   9/2012
JP   2015-194660   11/2015
(Continued)

OTHER PUBLICATIONS

Extended European Search Report for Application No. 18248146.5 dated May 31, 2019, 51 pages.
(Continued)

*Primary Examiner* — William R Alexander
*Assistant Examiner* — Henry A Duong
(74) *Attorney, Agent, or Firm* — Brundidge & Stanger, P.C.

(57) ABSTRACT

The lens driving device includes: an AF driving section that includes AF coils and AF magnets, and moves an AF movable part including the AF coils in an optical-axis direction with respect to an AF fixing part including the AF magnets; and an OIS driving section that includes OIS magnets and OIS coils, and sways an OIS movable part including the AF driving section and the OIS magnets in a plane orthogonal to the optical-axis direction with respect to an OIS fixing part including the OIS coil. The AF movable part includes a first position detection magnet and the OIS fixing part includes a hall element provided facing the first position detection magnet in the optical-axis direction.

12 Claims, 14 Drawing Sheets

(51) Int. Cl.
  *G03B 13/36* (2006.01)
  *G02B 27/64* (2006.01)
  *G03B 5/02* (2006.01)
  *H02K 11/215* (2016.01)
  *G03B 5/06* (2006.01)
  *H02K 41/035* (2006.01)
  *H04N 5/232* (2006.01)

(52) U.S. Cl.
  CPC ........... *G03B 13/36* (2013.01); *H02K 11/215* (2016.01); *H02K 41/0356* (2013.01); *H04N 5/23287* (2013.01); *G03B 2205/0023* (2013.01); *G03B 2205/0069* (2013.01); *H02K 2201/18* (2013.01)

(58) Field of Classification Search
  CPC . G03B 5/02; G03B 5/06; G03B 13/36; G03B 2205/0023; G03B 2205/0069; G03B 5/00; G03B 2205/0007; H02K 11/215; H02K 41/0356; H02K 2201/18; H04N 5/23287; H04M 1/0264
  USPC ........................................................ 359/557
  See application file for complete search history.

(56) References Cited

U.S. PATENT DOCUMENTS

2018/0188527 A1* 7/2018 Hu .................... G01D 5/12
2018/0343369 A1* 11/2018 Kim .................. H04N 5/2257

FOREIGN PATENT DOCUMENTS

| KR | 10-2016-0052880 A | 5/2016 |
| WO | 2016/006168 A1 | 1/2016 |
| WO | 2017138041 A1 | 8/2017 |

OTHER PUBLICATIONS

Notice of the Reasons for Rejection dated Aug. 18, 2020, 9 pages.

* cited by examiner

LENS DRIVING DEVICE, CAMERA MODULE, AND CAMERA-MOUNTED DEVICE

CROSS REFERENCE TO RELATED APPLICATIONS

This application is entitled to the benefit of Japanese Patent Application No. 2017-254222, filed on Dec. 28, 2017, the disclosure of which including the specification, drawings and abstract is incorporated herein by reference in its entirety.

TECHNICAL FIELD

The present invention relates to an auto-focusing and optical image stabilization lens driving device, a camera module, and a camera-mounted device.

BACKGROUND ART

In general, a small-sized camera module is mounted in mobile terminals, such as smartphones. A lens driving device having an autofocus function of automatically performing focusing during capturing a subject (hereinafter referred to as "AF (Auto Focus) function") and an optical image stabilization function (hereinafter referred to as "OIS function") to optically correct shake (vibration) occurring during photographing and mitigate disorder of an image is applied in such a camera module.

The auto-focusing and optical image stabilization lens driving device includes an autofocus driving section (hereinafter referred to as "AF driving section") to move a lens part in an optical-axis direction and an optical image stabilization driving section (hereinafter referred to as "OIS driving section") to sway the lens part in a plane orthogonal to the optical-axis direction. In PTL 1, a voice coil motor (VCM) is applied to the AF driving section and OIS driving section.

An AF driving section adopting a VCM driving system includes, for example, an auto-focusing coil (hereinafter referred to as "AF coil") disposed at the periphery of the lens part and an auto-focusing magnet (hereinafter referred to as "AF magnet") disposed to be radially spaced apart from the AF coil. An autofocus movable part (hereinafter referred to as "AF movable part") including the lens part and AF coil is supported in a state of being radially spaced apart from an autofocus fixing part (hereinafter referred to as "AF fixing part") including the AF magnet by an autofocus supporting part (hereinafter referred to as "AF supporting part", for example, a plate spring). Focusing is automatically carried out by moving the AF movable part in the optical-axis direction by utilizing a driving force of a voice coil motor composed of the AF coil and the AF magnet. Here, "radial direction" is a direction orthogonal to the optical axis.

An OIS driving section adopting the VCM driving system includes, for example, an optical image stabilization magnet (hereinafter referred to as "OIS magnet") disposed in the AF driving section and an optical image stabilization coil (hereinafter referred to as "OIS coil") disposed spaced apart from the OIS magnet in the optical-axis direction. An optical image stabilization movable part (hereinafter referred to as "OIS movable part") including the AF driving section and OIS magnet is supported in a state of being spaced apart in the optical-axis direction from an optical image stabilization fixing part (hereinafter referred to as "OIS fixing part") including the OIS coil by an optical image stabilization supporting part (hereinafter referred to as "OIS supporting part", for example, a suspension wire). Optical image stabilization is carried out by swaying the OIS movable part in the plane orthogonal to the optical-axis direction by utilizing a driving force of a voice coil motor composed of the OIS magnet and OIS coil.

Recently, there has been proposed an AF driving section including a position detection section for detecting a position of the AF movable part in the optical-axis direction (for example, see PTL 1). The position detection section uses, for example, a hall element that detects a change in a magnetic field using Hall effect. By feeding back detection results from the position detection section and controlling current flowing through the AF coil, accurate focusing can be carried out in a short time, and thereby reliability of the AF driving section improves. The lens driving device disclosed in PTL 1 has a position detection magnet disposed in the AF movable part and a hall element disposed in the AF fixing part.

CITATION LIST

Patent Literature

PTL 1
2016/006168

SUMMARY OF INVENTION

Technical Problem

In the past, feedback control based on detection results from a position detection section is carried out by an external control section (for example, a camera module). Therefore, in the case of providing the position detection section in an AF driving section, there is a need for a power feeding path and signal path for a hall element in addition to a power feeding path for an AF coil between an OIS movable part and OIS fixing part. In the case of using a suspension wire that is an OIS supporting part as the power feeding path and signal path for the hall element, two pairs of suspension wires are necessary. In other words, as a configuration of the OIS supporting part, three pairs, six in total, suspension wires including one pair of the power feeding path for the AF coil are necessary. As the number of suspension wires increases, behavior during optical image stabilization is influenced in addition to an increase in assembling steps, and thus design becomes complicated. The same thing applies regardless of a configuration of the OIS supporting part.

An object of the present invention is to provide a lens driving device, a camera module, and a camera-mounted device that can simplify a configuration to detect a position of an AF movable part in an optical-axis direction and improve reliability of an AF driving section.

Solution to Problem

A lens driving device according to the present invention includes:

an autofocus driving section including an auto-focusing coil to be disposed at a periphery of a lens part and an auto-focusing magnet to be disposed radially spaced apart from the auto-focusing coil, the autofocus driving section being configured to move an autofocus movable part including the auto-focusing coil in an optical-axis direction with respect to an autofocus fixing part including the auto-focusing magnet; and an optical image stabilization driving section including an optical image stabilization magnet to be disposed in the autofocus driving section and an optical image stabilization coil to be disposed spaced apart from the optical image stabilization magnet in the optical-axis direction, the optical image stabilization driving section being configured to sway an optical image stabilization movable part including the autofocus driving section and the optical image stabilization magnet in a plane orthogonal to the optical-axis direction with respect to an optical image stabilization fixing part including the optical image stabilization coil, in which the autofocus movable part includes a first position detection magnet, and in which the optical image stabilization fixing part includes a first hall element to be provided facing the first position detection magnet in the optical-axis direction.

A camera module according to the present invention includes:

the lens driving device described above;

a lens part to be mounted in the autofocus movable part; and an image capturing part configured to capture a subject image formed by the lens part.

A camera-mounted device according to the present invention is an information device or a transporting device, the camera-mounted device including:

the camera module described above; and an image processing section configured to process image information obtained by the camera module.

Advantageous Effects of Invention

According to the present invention, a configuration to detect a position of an AF movable part in an optical-axis direction can be simplified and reliability of an AF driving section can be improved.

DESCRIPTION OF EMBODIMENTS

Hereinafter, an embodiment of the present invention will be described in detail with reference to the drawings.

Figure 1A:
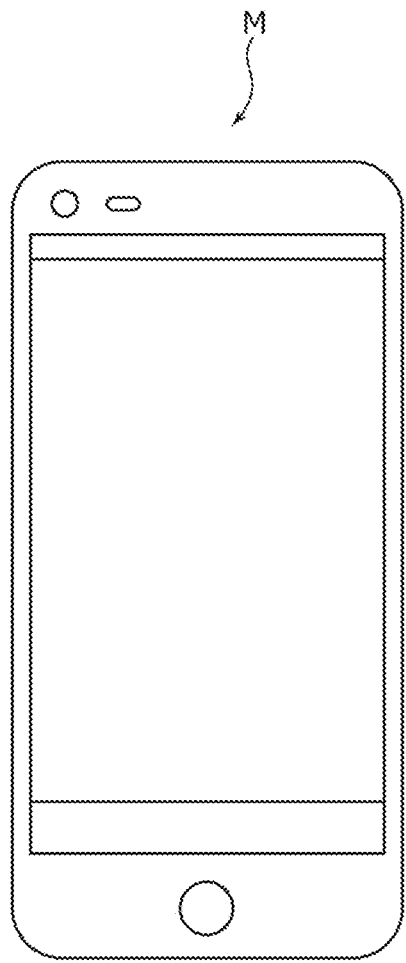
FIGS. 1A and 1B are diagrams illustrating a smart phone equipped with a camera module according to an embodiment of the present invention.
Figure 1B:
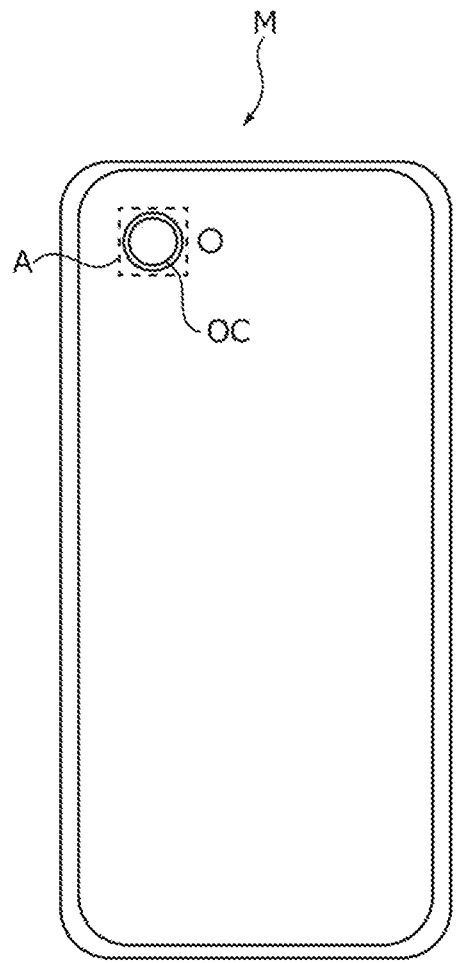

FIGS. 1A and 1B are diagrams illustrating smart phone M (camera-mounted device) equipped with camera module A according to an embodiment of the present invention. FIG. 1A is a front view of smart phone M and FIG. 1B is a rear view of smart phone M.

Smart phone M is equipped with camera module A, for example, as rear camera OC. Camera module A has an AF function and OIS function, automatically brings into focus during photographing a subject, and can take an image without image shake by optically correcting shake (vibration) occurring during photographing.

Figure 2:
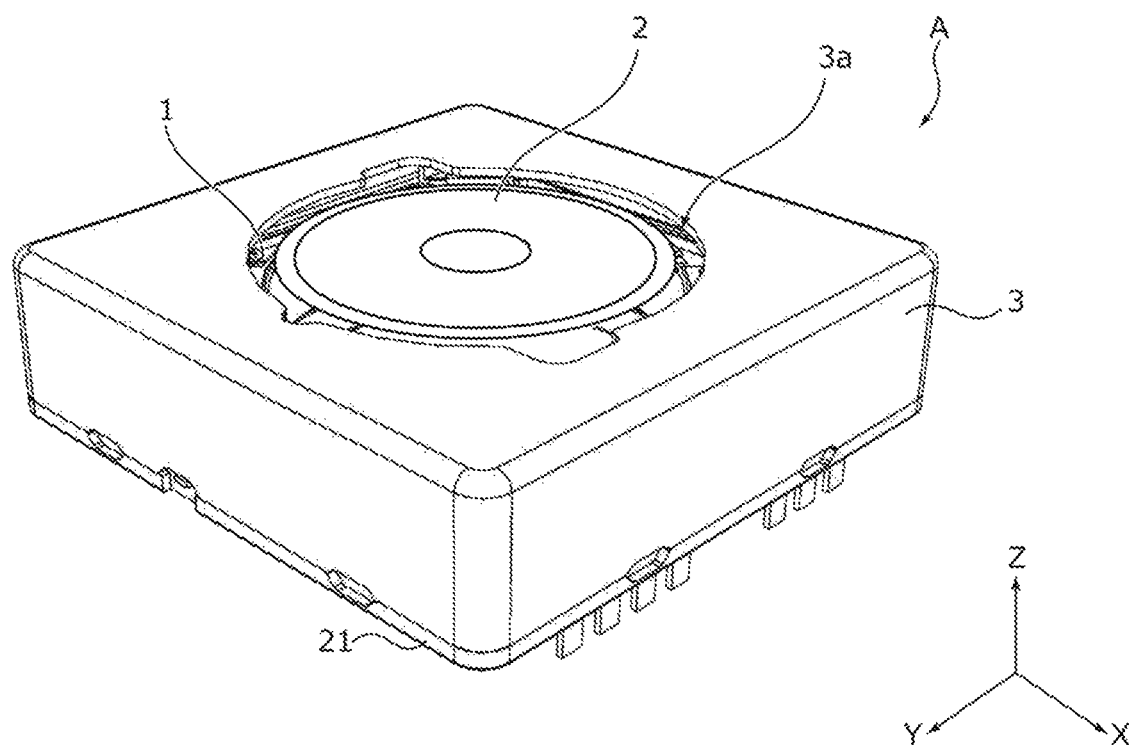
FIG. 2 is an external perspective view of the camera module.

FIG. 2 is an external perspective view of camera module A.

As illustrated in FIG. 2, descriptions will be given for the embodiment with an orthogonal coordinate system (X, Y, Z). The same orthogonal coordinate system (X, Y, Z) is also used for illustration of below-mentioned drawings. Camera module A is mounted such that an X-direction is a vertical direction (or horizontal direction), a Y-direction the horizontal direction (or vertical direction), and a Z-direction a front-rear direction during actually photographing a subject with smart phone M. That is, the Z-direction is an optical-axis direction, the upper side in the drawings is a light reception side in the optical-axis direction (also called "macro position side"), and the lower side an image formation side in the optical-axis direction (also called "infinity position side"). In addition, the X- and Y-directions orthogonal to the Z-axis are referred to as "optical-axis-orthogonal direction". Furthermore, a direction resulting from rotating the X- and Y-directions by 45° in an XY plane is referred to as "diagonal direction".

Camera module A includes: lens driving device 1 to make the AF function and OIS function a reality; lens part 2 including a cylindrical lens barrel and a lens housed therein; an image capturing part (not illustrated) configured to capture a subject image formed by lens part 2; a cover 3 to cover the whole, and the like.

Cover 3 is a square-shaped barrel with a lid in a plan view viewed from the light reception side in the optical-axis direction, and includes a circular opening 3a on its upper surface. Lens part 2 is seen from the outside through opening 3a. Cover 3 is fixed to base 21 of lens driving device 1 by, for example, adhesion.

The image capturing part is disposed on the image formation side in the optical-axis direction of lens driving device 1. The image capturing part (not illustrated) includes, for example, an image-sensor board (not illustrated) and an imaging device (not illustrated) mounted on the image-sensor board. The imaging device is composed of, for example, a charge-coupled device (CCD) image sensor, complementary metal oxide semiconductor (CMOS) image sensor, or the like. The imaging device captures a subject image formed by the lens part (not illustrated).

A control section to control driving of lens driving device 1 may be provided on the image-sensor board or may be provided on a camera-mounted device (in the embodiment, smart phone M) equipped with camera module A.

Figure 3A:
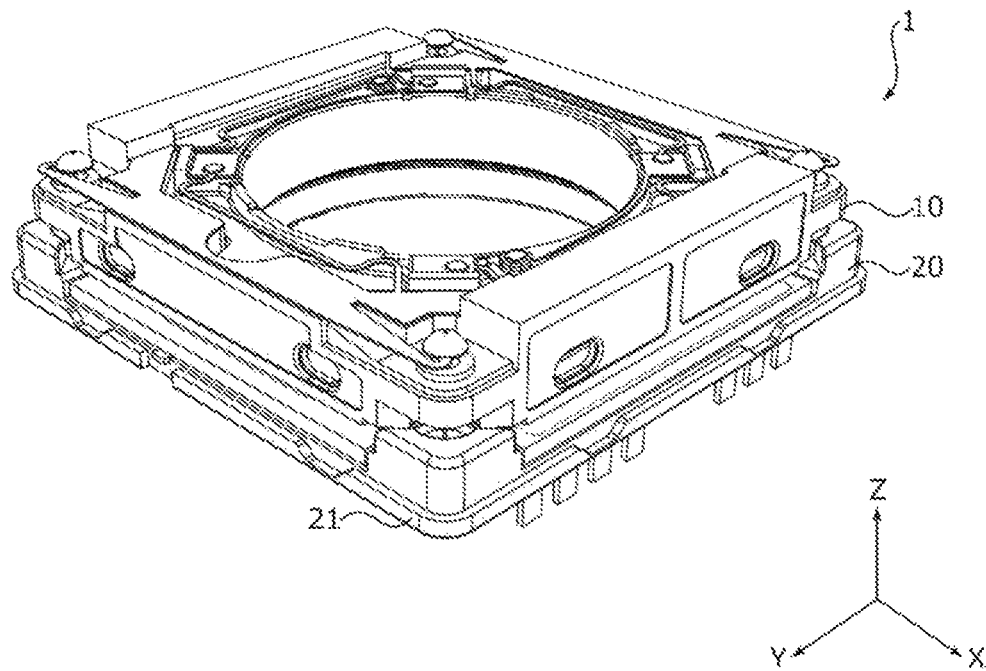
FIGS. 3A and 3B are external perspective views of a lens driving device.
Figure 3B:
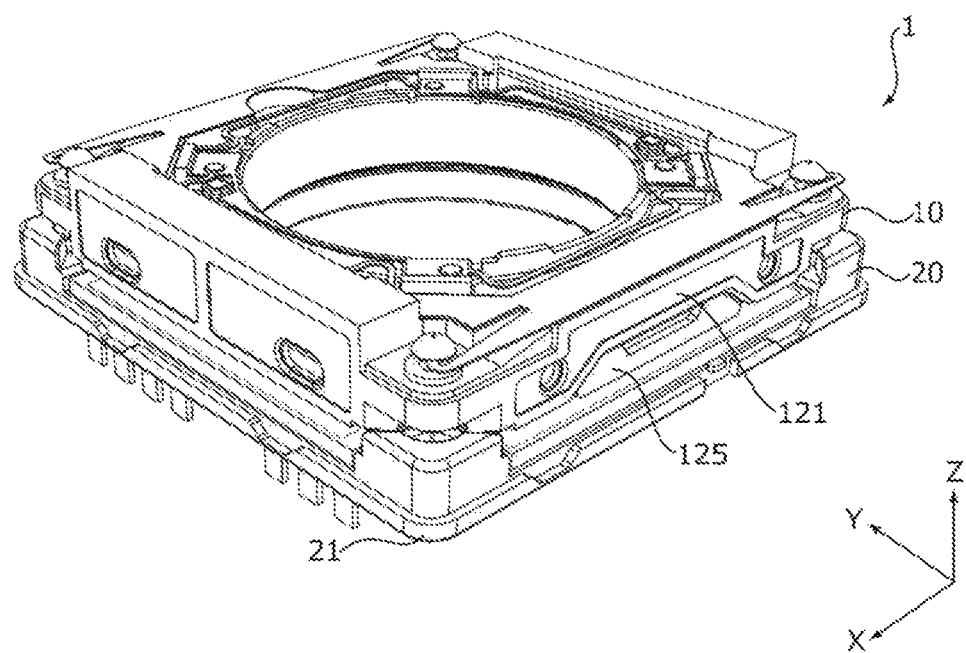
Figure 4:
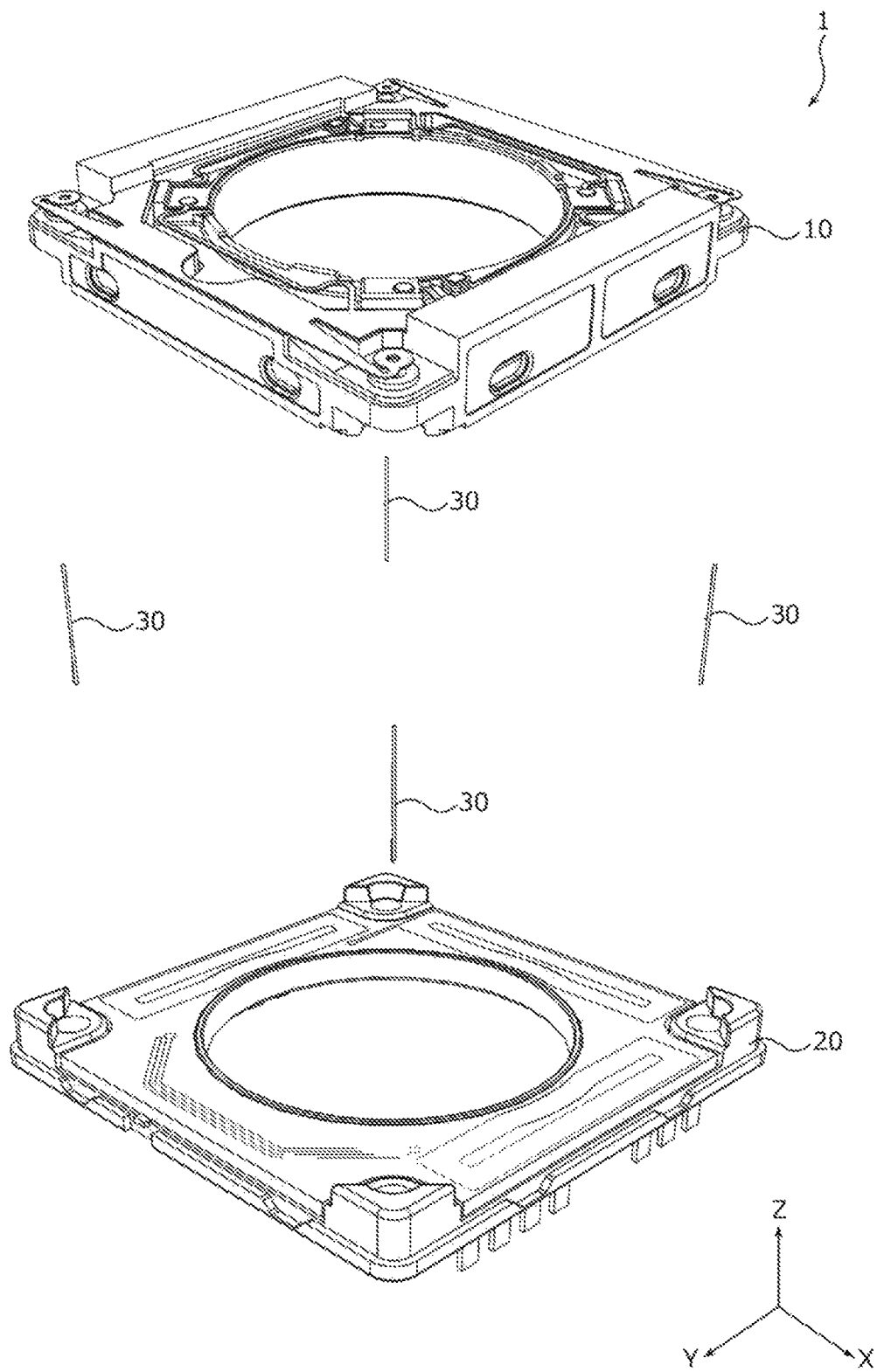
FIG. 4 is an exploded perspective view of the lens driving device.
Figure 5:
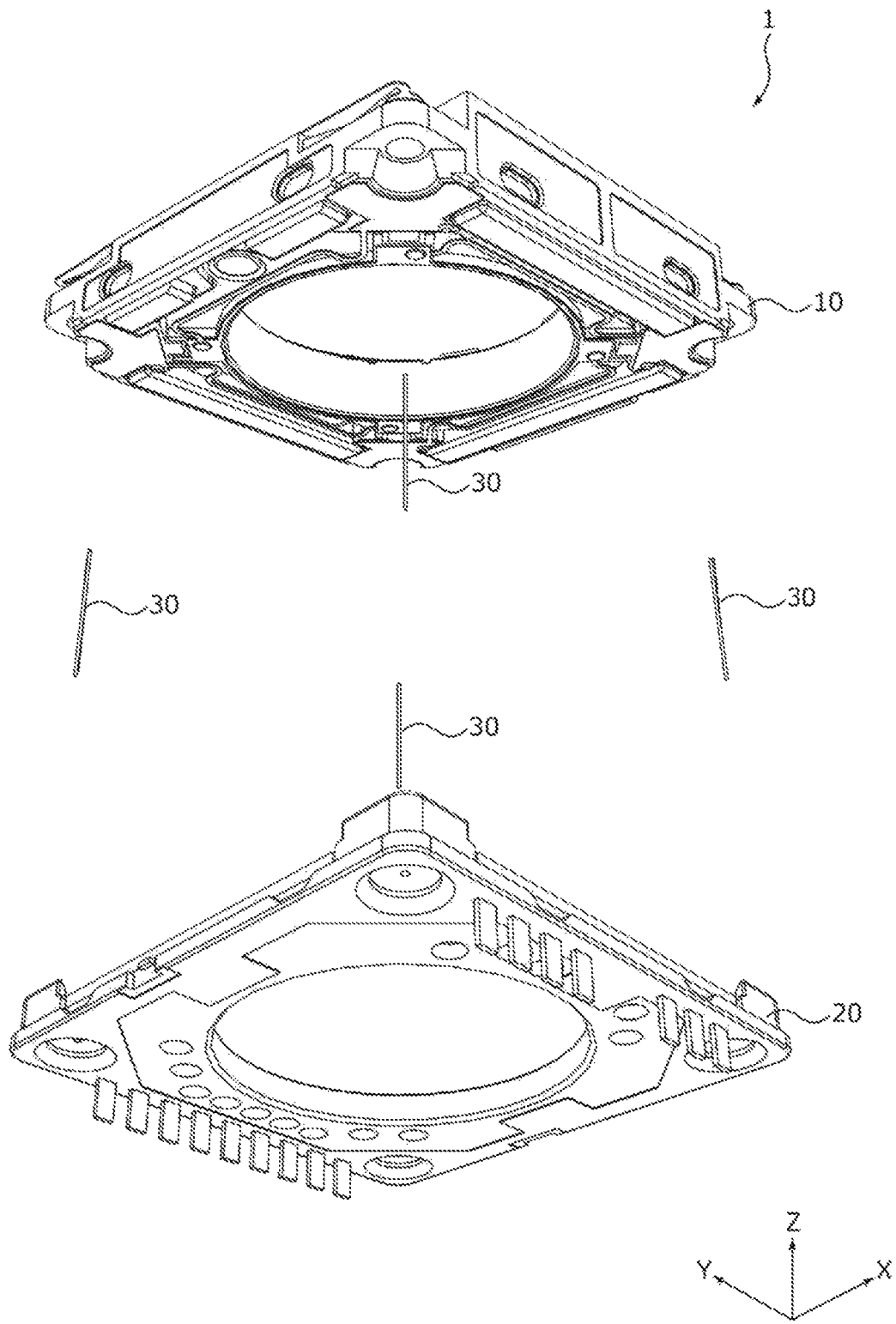
FIG. 5 is an exploded perspective view of the lens driving device.
Figure 6A:
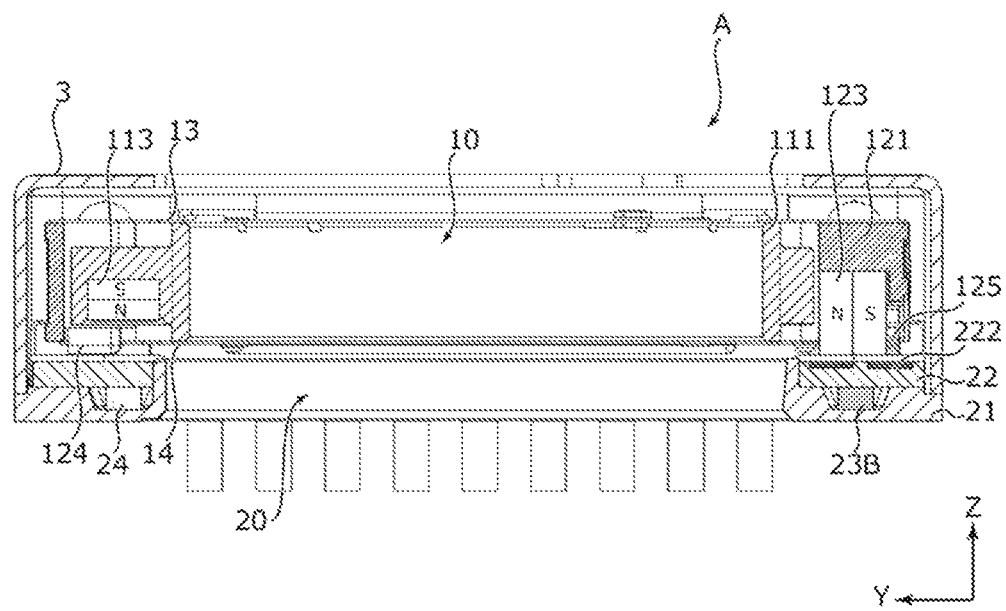
FIGS. 6A and 6B are cross-section views of the camera module.
Figure 6B:
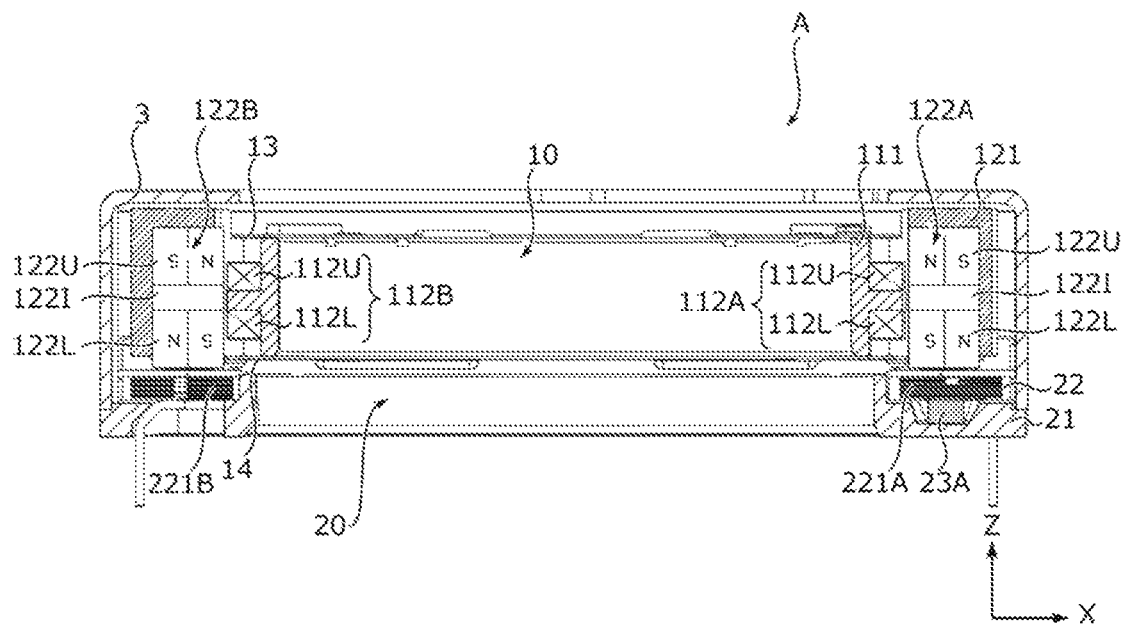

FIGS. 3A and 3B are external perspective views of lens driving device 1. FIG. 3B is a diagram resulting from rotating FIG. 3A by 90° clockwise centering around the Z-axis. FIGS. 4 and 5 are exploded perspective views of lens driving device 1. FIG. 4 is an upper perspective view and FIG. 5 a lower perspective view. FIGS. 6A and 6B are cross-section views of camera module A. FIG. 6A is a cross-section view on a YZ plane passing through the optical axis and FIG. 6B a cross-section view on an XZ plane passing through the optical axis.

As illustrated in FIGS. 3A, 3B, 4, 5, 6A, and 6B, lens driving device 1 includes OIS movable part 10, OIS fixing part 20, OIS supporting part 30, and the like.

OIS movable part 10 includes driving magnets 122A and 122B (OIS magnets) constituting part of an OIS voice coil motor, and is a part to sway in an XY plane during optical image stabilization. OIS fixing part 20 includes OIS coils 221A, 221B, and 222 constituting part of the OIS voice coil motor, and is a part to support OIS movable part 10 via OIS supporting part 30. In other words, the OIS driving section of lens driving device 1 adopts a moving magnet system. OIS movable part 10 includes an AF driving device including AF movable part 11 and AF fixing part 12 (see FIGS. 7 and 8).

OIS movable part 10 is disposed spaced apart from OIS fixing part 20 in the light reception side in the optical-axis direction and coupled with OIS fixing part 20 via OIS supporting part 30. In the embodiment, OIS supporting part 30 is composed of four suspension wires (hereinafter referred to as "suspension wire 30") extending along the Z-direction.

One end (upper end) of suspension wire 30 is fixed to OIS movable part 10 (in the embodiment, AF supporting part 13 (see FIGS. 7 and 8)). In addition, the other end (lower end) of suspension wire 30 is fixed to OIS fixing part 20 (in the embodiment, base 21). OIS movable part 10 is supported in a swayable manner in the XY plane by suspension wire 30. In the embodiment, at least two of four wires of suspension wire 30 are used as power feeding paths to AF coils 112A and 112B. In addition, the above-described fixing portions for suspension wire 30 of OIS movable part 10 and OIS fixing part 20 are one example and not limited to those.

Figure 7:
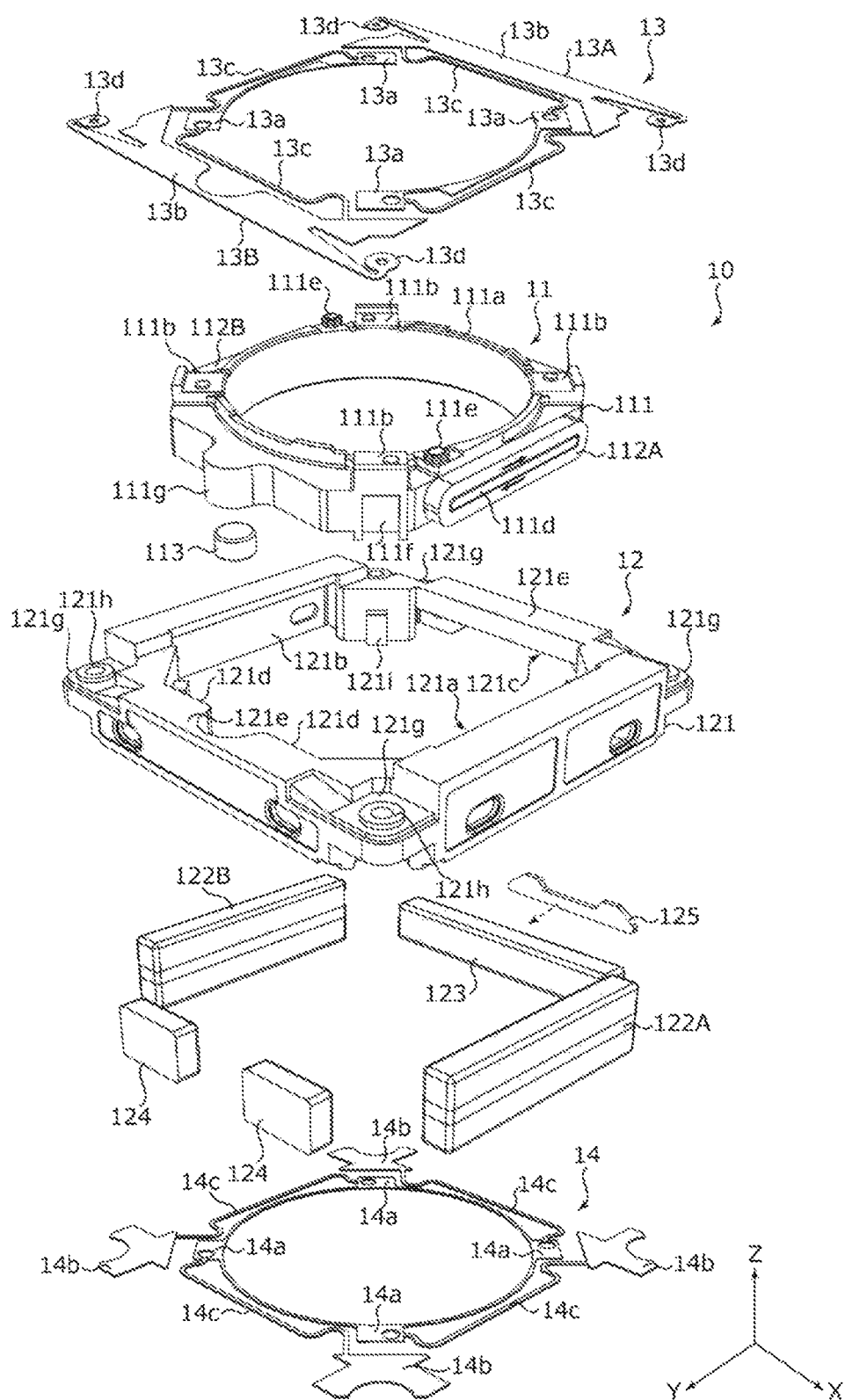
FIG. 7 is an exploded perspective view of an OIS movable part.
Figure 8:
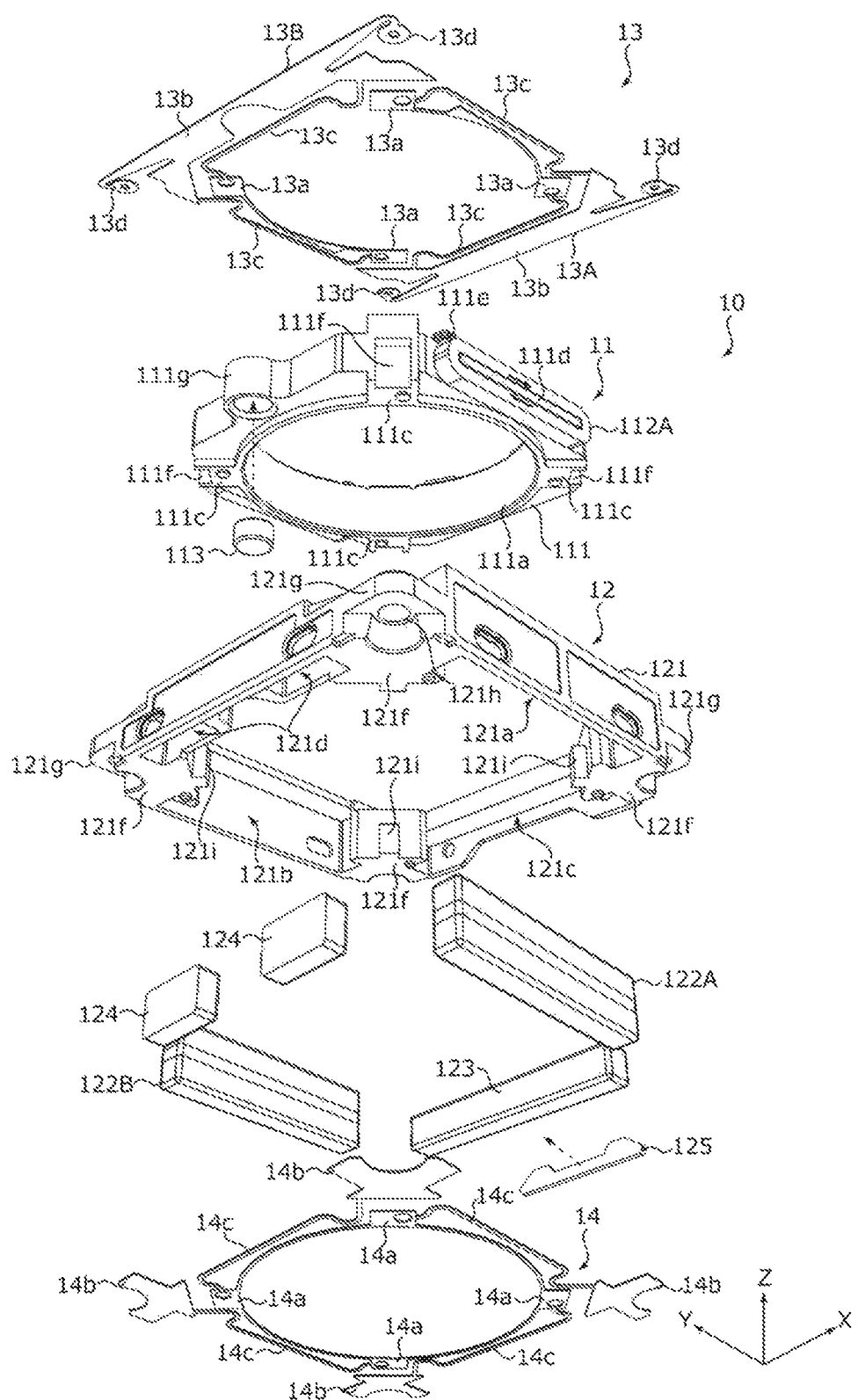
FIG. 8 is an exploded perspective view of the OIS movable part.

FIGS. 7 and 8 are exploded perspective views of OIS movable part 10. FIG. 7 is an upper perspective view and FIG. 8 a lower perspective view.

As illustrated in FIGS. 7 and 8, OIS movable part 10 includes AF movable part 11, AF fixing part 12, AF supporting parts 13 and 14, and the like.

AF movable part 11 includes AF coils 112A and 112B constituting part of an AF voice coil motor, and moves in the optical-axis direction during focusing. AF fixing part 12 includes driving magnet 123 (AF magnet) and supports AF movable part 11 via AF supporting parts 13 and 14. That is, the AF driving section of lens driving device 1 adopts the moving coil system.

AF movable part 11 is disposed spaced apart from AF fixing part 12 and is coupled with AF fixing part 12 via AF supporting parts 13 and 14. In the embodiment, AF movable part 11 is radially spaced apart from AF fixing part 12. AF supporting part 13 is an upper-side elastic supporting member to support AF movable part 11 on the light reception side in the optical-axis direction (upper side) with respect to AF fixing part 12. In the embodiment, AF supporting part 13 is composed of two plate springs 13A and 13B (hereinafter referred to as "upper springs 13A and 13B"). AF supporting part 14 is a lower-side elastic supporting member to support AF movable part 11 on the image formation side in the optical-axis direction (lower side) with respect to AF fixing part 12. In the embodiment, AF supporting part 14 is composed of one plate spring (hereinafter referred to as "lower spring 14").

AF movable part 11 includes lens holder 111, AF coils 112A and 112B, and position detection magnet 113.

Lens holder 111 includes cylindrical lens housing 111a at its center. Lens housing 111a has lens part 2 (see FIG. 2) fixed thereto by adhesion or screwing. In the embodiment, lens holder 111 is octagonal in a plan view viewed from the optical-axis direction.

Lens holder 111 includes, on its upper surface, upper spring fixing portions 111b to which upper springs 13A and 13B are fixed. In the embodiment, upper spring fixing portions 111b are provided at four corners on the upper surface of lens holder 111, in other words, at positions intersecting with the diagonal directions passing through the optical axis. In the embodiment, upper spring fixing portions 111b include positioning bosses (whose reference numeral is omitted) protruding to the light reception side in the optical-axis direction, and upper springs 13A and 13B are positioned with the positioning bosses.

Lens holder 111 includes, on its lower surface, lower spring fixing portion 111c to which lower spring 14 is fixed. In the embodiment, lower spring fixing portions 111c are provided at four corners of the lower surface of lens holder 111. In the embodiment, lower spring fixing portions 111c include positioning bosses (whose reference numeral is omitted) protruding to the image formation side in the optical-axis direction, and lower spring 14 is positioned with the positioning bosses.

Lens holder 111 includes coil-attachment portions 111d and 111d to which AF coils 112A and 112B are attached. In the embodiment, lens holder 111 includes, on outer surfaces of two sidewalls along the Y-direction, coil-attachment portions 111d which protrude in the radial direction and are elliptic (shape of a rounded rectangular).

Lens holder 111 includes, on the upper surface and in the vicinity of coil-attachment portions 111d, tying parts 111e to which ends of AF coils 112 are connected. In addition, lens holder 111 includes, on outer sides at the four corners, engagement grooves 111f into which regulation pieces 121i of magnet holder 121 are fit.

Lens holder 111 includes magnet housing 111g to house Z position detection magnet 113. In the embodiment, magnet housing 111g is provided near the center in a longitudinal direction (X-direction) on an outer surface of one sidewall of lens holder 111 along the X-direction so that it swells out in the radial direction (Y-direction). Magnet housing 111g includes a magnet housing hole (whose reference numeral is omitted) opening downward.

AF coils 112A and 112B are air-core coils to be energized during focusing. In the embodiment, AF coils 112A and 112B are wound flat along coil-attachment portions 111d. In other words, AF coils 112A and 112B are elliptic and each include first linear portion 112U and second linear portion 112L.

AF coils 112A and 112B are disposed such that their coil planes are in parallel with the optical axis, here the YZ plane is the coil planes. In other words, AF coils 112A and 112B are disposed such that first linear portion 112U is on the light reception side in the optical-axis direction (upper side) and second linear portion 112L is on the image formation side in the optical-axis direction (lower side).

Ends of AF coils 112A and 112B are wound around tying parts 111e of lens holder 111 and electrically connected with upper springs 13A and 13B. Energization current flowing through AF coils 112A and 112B is controlled by driving control section 200 (see FIG. 11).

AF coils 112A and 112B are disposed only at portions of magnetic circuits formed by AF magnets 122A and 122B by adopting flat coils like AF coils 112A and 112B. Thus, driving efficiency improves in comparison with the case where an AF coil is formed by winding a wire around the entire circumference of lens holder 111, and thereby weight saving and power saving can be achieved.

AF coils 112A and 112B are preferably made from copper clad aluminum wires that are aluminum wires covered with copper. This allows AF coils 112A and 112B to be lighter in weight in comparison with the case where they are made from copper wires.

Z position detection magnet 113 (first position detection magnet) generates a magnetic field for detecting the position of AF movable part 11 in the optical-axis direction. In the embodiment, Z position detection magnet 113 is made of a single-pole magnet and disposed in magnet housing 111g of lens holder 111 so that its magnetization direction coincides with the optical-axis direction. This allows the magnetic field formed by Z position detection magnet 113 to efficiently intersect with AF hall element 24 (first hall element) (see FIG. 6A). Thus, detection accuracy by AF hall element 24 improves.

In the embodiment, Z position detection magnet 113 is cylindrical. In this case, output of AF hall element 24 depends on displacement (which corresponds to a radius having an origin at a reference position) from the reference position (position in the XY plane when optical image stabilization is not carried out) of Z position detection magnet 113. In other words, the output of AF hall element 24 is the same if displacement from the reference position is the same even if a position in the XY plane (hereinafter referred to as "XY position") of OIS movable part 10 is different. Therefore, a correction value to cancel out an impact of optical image stabilization can be easily calculated by converting the XY position of OIS movable part 10 into a radius and representing it as displacement. In this way, if optical image stabilization causes OIS movable part 10 to sway in the XY plane and the magnetic field intersecting with AF hall element 24 changes, correction can be made easily.

In the embodiment, Z position detection magnet 113 is disposed at a position where it does not interfere with driving magnets 122A, 122B, and 123. Specifically, driving magnets 122A, 122B, and 123 are disposed along two sides along the Y-direction and one side along the X-direction among four sides defining a rectangle, and Z position detection magnet 113 is disposed on the other side (particular side) along the X-direction where none of driving magnets 122A, 122B, and 123 are disposed. Especially, in the embodiment, Z position detection magnet 113 is disposed near the center of the particular side in the longitudinal direction. This can minimize an impact of driving magnets 122A, 122B, and 123 on the magnetic field formed by Z position detection magnet 113 and thereby improves detection accuracy by AF hall element 24.

AF fixing part 12 includes magnet holder 121, driving magnets 122A, 122B, and 123, and counter weight 124.

Magnet holder 121 is disposed radially spaced apart from AF movable part 11, and holds driving magnets 122A, 122B, and 123. In the embodiment, magnet holder 121 is composed of a rectangular barrel close to a square in a plan view. An inner periphery surface of magnet holder 121 is formed close to an octagon fit for a contour of lens holder 111. In addition, a portion of magnet holder 121 facing magnet housing 111g of lens holder 111 is made to form a recess toward the outside in the radial direction.

Magnet holder 121 includes magnet holding sections 121a-121c to hold AF and OIS driving magnets 122A, 122B, and 123. In the embodiment, magnet holding sections 121a and 121b to hold driving magnets 122A and 122B are provided on inner surfaces of two sidewalls of magnet holder 121 along the Y-direction. Furthermore, a magnet holding section 121c to hold driving magnet 123 is provided on an inner surface of one sidewall of magnet holder 121 along the X-direction. In the embodiment, magnet holding sections 121a-121c are provided with openings (whose reference numeral is omitted) communicated with the outside, which allows an adhesive to be injected into contact faces between magnet holding sections 121a-121c and driving magnets 122A, 122B, and 123. In addition, a notch is formed at a portion related to yoke 125 of magnet holding section 121c.

Magnet holder 121 includes counter weight holding section 121d to hold counter weight 124. In the embodiment, counter weight holding section 121d is provided on the other sidewall along the X-direction. In addition, in the embodiment, counter weight holding section 121d is provided with an opening (whose reference numeral is omitted) communicated with the outside, which allows an adhesive to be injected into a contact face between counter weight holding section 121d and counter weight 124.

Magnet holder 121 includes, on its upper surface, upper spring fixing portions 121e to which upper springs 13A and 13B are fixed. In the embodiment, the upper surface of magnet holder 121 along the X-direction is upper spring fixing portions 121e.

Magnet holder 121 includes, on its undersurface, lower spring fixing portion 121f to which lower spring 14 is fixed. In the embodiment, lower spring fixing portions 121f are provided at four corners on the undersurface of magnet holder 121. In the embodiment, lower spring fixing portions 121f each include a positioning boss (whose reference numeral is omitted) protruding toward the light reception side in the optical-axis direction, and lower spring 14 is positioned with the positioning boss.

In the embodiment, magnet holder 121 includes wire insertion sections 121g at its four corners. Wire insertion sections 121g each include insertion hole 121h through which suspension wire 30 is inserted. A diameter of insertion hole 121h is set in consideration of a sway range of OIS movable part 10 in the XY plane. Lower portions of wire insertion sections 121g are made to form an arc-shaped recess toward the inside in the radial direction. This allows suspension wire 30 and magnet holder 121 to avoid interfering with each other when OIS movable part 10 sways.

Wire insertion sections 121g are made to form a recess on the image formation side in the optical-axis direction in comparison with upper spring fixing portions 121e. Suspension wire 30 is inserted into wire insertion hole 121h and connected with upper springs 13A and 13B by, for example, soldering. Upper springs 13A and 13B extend upward of wire insertion sections 121g in a state of floating from wire insertion sections 121g (see FIG. 3).

Magnet holder 121 includes regulation piece 121i to regulate movement of AF movable part 11. In the embodiment, inner surfaces of four corners of magnet holder 121 are provided with regulation pieces 121i projecting in the radial direction. Lens holder 111 is attached such that regulation pieces 121i of magnet holder 121 fit into engagement grooves 111f. In the reference state in which AF coils 112A and 112B are not energized, upper surfaces of regulation pieces 121*i* (surfaces on the light reception side in the optical-axis direction) are spaced apart from undersurfaces of engagement grooves 111*f* (surfaces on the light reception side in the optical-axis direction). When AF movable part 11 moves toward the image formation side in the optical-axis direction, the upper surfaces of regulation pieces 121*i* of magnet holder 121 come in contact with undersurfaces of engagement grooves 111*f* of lens holder 111, and thereby movement of AF movable part 11 toward the image formation side in the optical-axis direction is regulated.

Driving magnets 122A and 122B serve both as magnets constituting part of the AF voice coil motor (AF magnets) and magnets constituting part of the OIS voice coil motor (OIS magnets) in the X-direction. Driving magnets 122A and 122B are attached to magnet holding sections 121*a* and 121*b* of magnet holder 121, and fixed by, for example, adhesion. In other words, driving magnets 122A and 122B are disposed radially spaced apart from AF coils 112A and 112B, and spaced apart from OIS coils 221A and 221B in the optical-axis direction (see FIG. 6B).

Driving magnets 122A and 122B are magnetized so as to form a magnetic field that intersects AF coils 112A and 112B in the radial direction and OIS coils 221A and 221B in the optical-axis direction. In the embodiment, driving magnets 122A and 122B are cuboid and each composed of a both-sided four-pole magnet (for example, a permanent magnet) magnetized in a lateral direction (X-direction) (see FIG. 6B). Specifically, driving magnets 122A and 122B each include first magnet 122U and second magnet 122L. First magnet 122U and second magnet 122L are magnetized in the opposite direction to each other.

In driving magnets 122A and 122B, first magnet 122U is situated on the light reception side in the optical-axis direction and second magnet 122L on the image formation side in the optical-axis direction. In other words, driving magnets 122A and 122B are disposed such that first magnet 122U faces first linear portions 112U of AF coils 112A and 112B and second magnet 122L faces second linear portions 112L of AF coils 112A and 112B.

Mainly, the magnetic field by first magnet 122U intersects first linear portion 112U and the magnetic field by second magnet 122L intersects second linear portion 112L. Because the direction of the magnetic field by first magnet 122U is opposite to the direction of the magnetic field by second magnet 122L, when AF coils 112A and 112B are energized, the Lorentz forces in the same direction along the Z-direction are generated in first linear portion 112U and second linear portion 112L. In this way, in the embodiment, driving magnets 122A and 122B and AF coils 112A and 112B constitute at least main part of the AF voice coil motor.

Note that, magnetization directions of driving magnets 122A and 122B and energization current directions of AF coils 112A and 112B are set such that directions of the Lorentz forces generated in AF coils 112A and 112B during energization are the same.

In the embodiment, in driving magnets 122A and 122B, a non-magnetic layer 122*l* lies between first magnet 122U and second magnet 122L. By adjusting height of non-magnetic layer 122*l*, a region occupied by first magnet 122U and second magnet 122L (area of faces facing first linear portions 112U and second linear portions 112L of AF coils 112A and 112B) can be easily adjusted while keeping height of the whole of driving magnets 122A and 122B.

Driving magnet 123 is a magnet (OIS magnet) constituting part of a voice coil motor for OIS in the Y-direction. Driving magnet 123 is attached to a magnet holding section 121*c* of magnet holder 121 and fixed by, for example, adhesion. In other words, driving magnet 123 is disposed spaced apart from OIS coil 222 in the optical-axis direction (see FIG. 6A).

Driving magnet 123 is magnetized so as to form a magnetic field that intersects OIS coil 222 in the optical-axis direction. In the embodiment, driving magnet 123 is cuboid and composed of a single-pole magnet (for example, a permanent magnet) magnetized in a lateral direction (Y-direction) (see FIG. 6A). In addition, yoke 125 is disposed on an outside surface of driving magnet 123, and the magnetic field of driving magnet 123 efficiently intersects OIS coil 222. Disposition of yoke 125 allows driving magnet 123 to be made thinner (lighter) while securing the magnetic field intersecting OIS coil 222.

Counter weight 124 is a plummet to stabilize a horizontal attitude of OIS movable part 10 in the XY plane. Counter weight 124 is made from, for example, non-magnetic material such as brass, white metal, or the like. In the embodiment, two counter weights 124 are disposed so as to have Z position detection magnet 113 interposed between them in the X-direction. Counter weights 124 are inserted into counter weight holding sections 121*d* of magnet holder 121 and fixed by, for example, adhesion. Weight of counter weights 124 is set so as to balance OIS movable part 10 in the Y-direction in consideration of weight of driving magnet 123, Z position detection magnet 113, and the like. In addition, the positions and number of counter weights 124 can be changed according to need.

Upper springs 13A and 13B elastically support AF movable part 11 (lens holder 111) with respect to AF fixing part 12 (magnet holder 121). Upper springs 13A and 13B are made from, for example, beryllium copper, nickel copper, stainless, or the like. Upper springs 13A and 13B are formed and shaped by, for example, punching out from one metal sheet. In the embodiment, upper springs 13A and 13B are square as a whole.

Upper springs 13A and 13B each include lens holder fixing part 13*a* to be fixed to lens holder 111, magnet holder fixing part 13*b* to be fixed to magnet holder 121, and arm portion 13*c* configured to elastically deform as AF movable part 11 moves. Upper springs 13A and 13B are positioned with respect to lens holder 111 and magnet holder 121, and fixed by, for example, adhesion.

In the embodiment, lens holder fixing part 13*a* has a shape fit for upper spring fixing portion 111*b* of lens holder 111. At each of upper springs 13A and 13B, two lens holder fixing parts 13*a* are coupled with each other along a rim of lens housing 111*a* of lens holder 111. Lens holder fixing parts 13*a* are displaced together with AF movable part 11 when AF movable part 11 moves in the optical-axis direction.

In the embodiment, magnet holder fixing part 13*b* has a shape fit for upper spring fixing portion 121*e* of magnet holder 121 and extends along the X-direction. Arm portion 13*c* couples lens holder fixing part 13*a* with magnet holder fixing part 13*b*. Arm portion 13*c* includes a curvature portion (whose reference numeral is omitted) and is made easy to elastically deform when AF movable part 11 moves.

Upper springs 13A and 13B each include, at both ends of magnet holder fixing part 13*b*, wire connecting portions 13*d* to which suspension wire 30 is connected. In the embodiment, wire connecting portions 13*d* extend along the X-direction from magnet holder fixing part 13*b*, and are inflected inside from corners, and include wire insertion holes (whose reference numeral is omitted) at their tips. Suspension wire 30 is inserted into the wire insertion holes and are physically and electrically connected by, for example, soldering.

Wire connecting portions 13d are above wire insertion sections 121g of magnet holder 121, and gaps are formed between wire connecting portions 13d and wire insertion sections 121g of magnet holder 121 (see FIG. 3). In the gaps, damper material (not illustrated) is disposed so as to surround suspension wire 30. By making the damper material (not illustrated) lie between upper springs 13A and 13B and magnet holder 121, occurrence of undesired resonance (higher-order resonance mode) is prevented, and thereby stability of operation can be secured. The damper material can be easily applied, for example, using a dispenser. As the damper material, for example, ultraviolet cure silicone gel can be applied.

Lower spring 14 elastically supports AF movable part 11 (lens holder 111) with respect to AF fixing part 12 (magnet holder 121). Lower spring 14 is made from, for example, beryllium copper, nickel copper, stainless, or the like in the same manner as upper springs 13A and 13B. Lower spring 14 is formed and shaped by, for example, punching out from one metal sheet. In the embodiment, lower spring 14 is square as a whole.

Lower spring 14 includes lens holder fixing part 14a to be fixed to lens holder 111, magnet holder fixing part 14b to be fixed to magnet holder 121, and arm portion 14c configured to elastically deform as AF movable part 11 moves. Lower spring 14 is positioned with respect to lens holder 111 and magnet holder 121, and fixed by, for example, adhesion.

In the embodiment, lens holder fixing parts 14a have a shape fit for lower spring fixing portions 111c of lens holder 111. Four lens holder fixing parts 14a are coupled with each other along a rim of lens housing 111a of lens holder 111. Lens holder fixing parts 14a are displaced together with AF movable part 11 when AF movable part 11 moves in the optical-axis direction.

In the embodiment, magnet holder fixing parts 14b have a shape fit for lower spring fixing portions 121f of magnet holder 121. Corners of magnet holder fixing parts 14b are cut off in an arc inward so as not to interfere with suspension wire 30. Arm portion 14c couples lens holder fixing part 14a with magnet holder fixing part 14b. Arm portion 14c includes a curvature portion (whose reference numeral is omitted) and is made easy to elastically deform when AF movable part 11 moves.

When OIS movable part 10 is assembled, AF coils 112A and 112B and Z position detection magnet 113 are attached to lens holder 111. On the other hand, driving magnets 122A, 122B, and 123 and counter weight 124 are attached to magnet holder 121. In this state, lens holder 111 is attached to magnet holder 121 from the light reception side in the optical-axis direction. In other words, lens holder 111 is disposed inside of magnet holder 121 so that AF coils 112A and 112B face driving magnets 122A and 122B.

Lens holder 111 and magnet holder 121 have upper springs 13A and 13B attached to their upper surfaces, and lower spring 14 attached to the undersurfaces. In addition, part of each of upper springs 13A and 13B is soldered to one end of each of AF coils 112A and 112B twined around tying parts 111e of lens holder 111 and physically and electrically connected. AF coils 112A and 112B are energized via suspension wire 30 and upper springs 13A and 13B.

Figure 9:
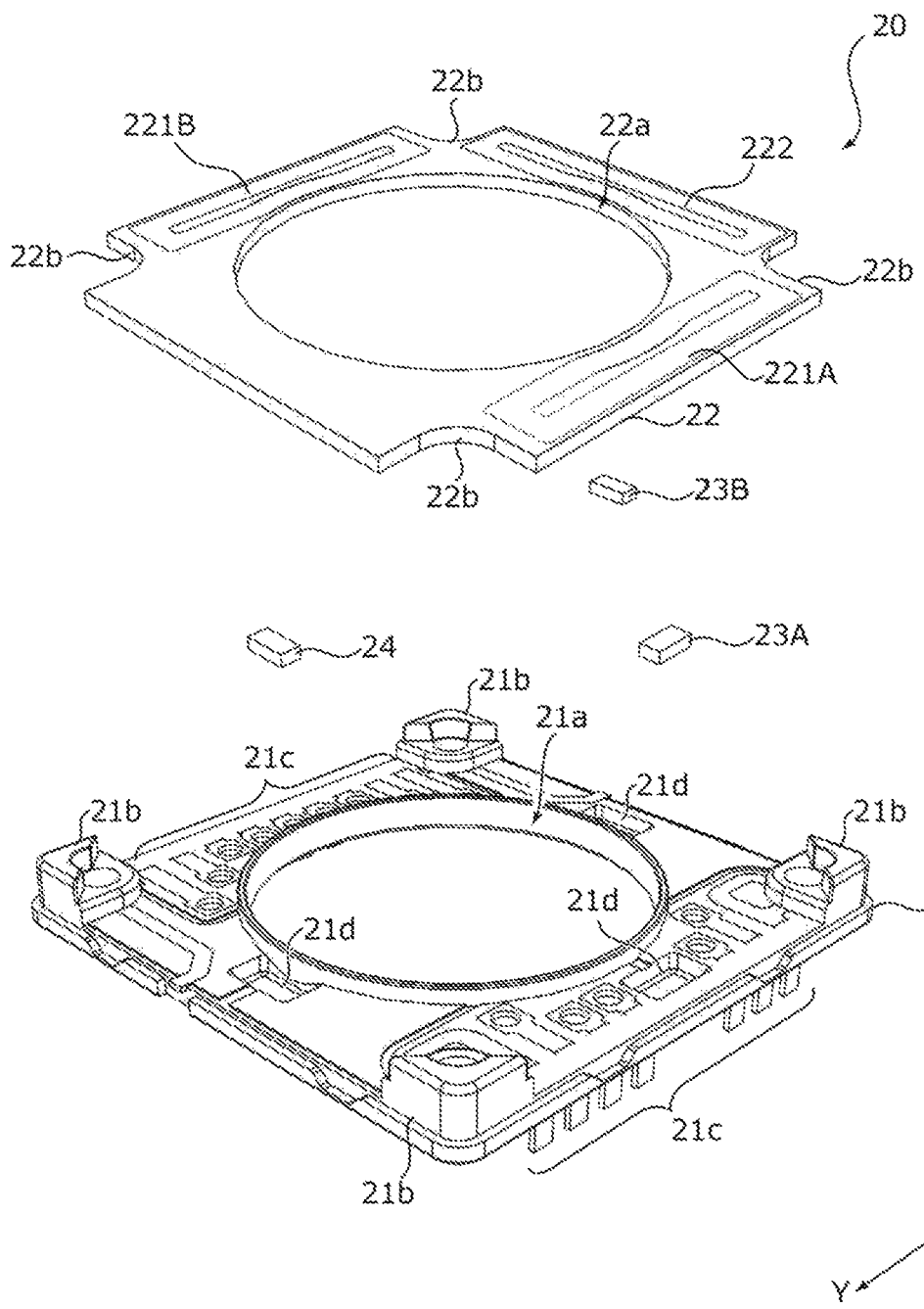
FIG. 9 is an exploded perspective view of an OIS fixing part.
Figure 10:
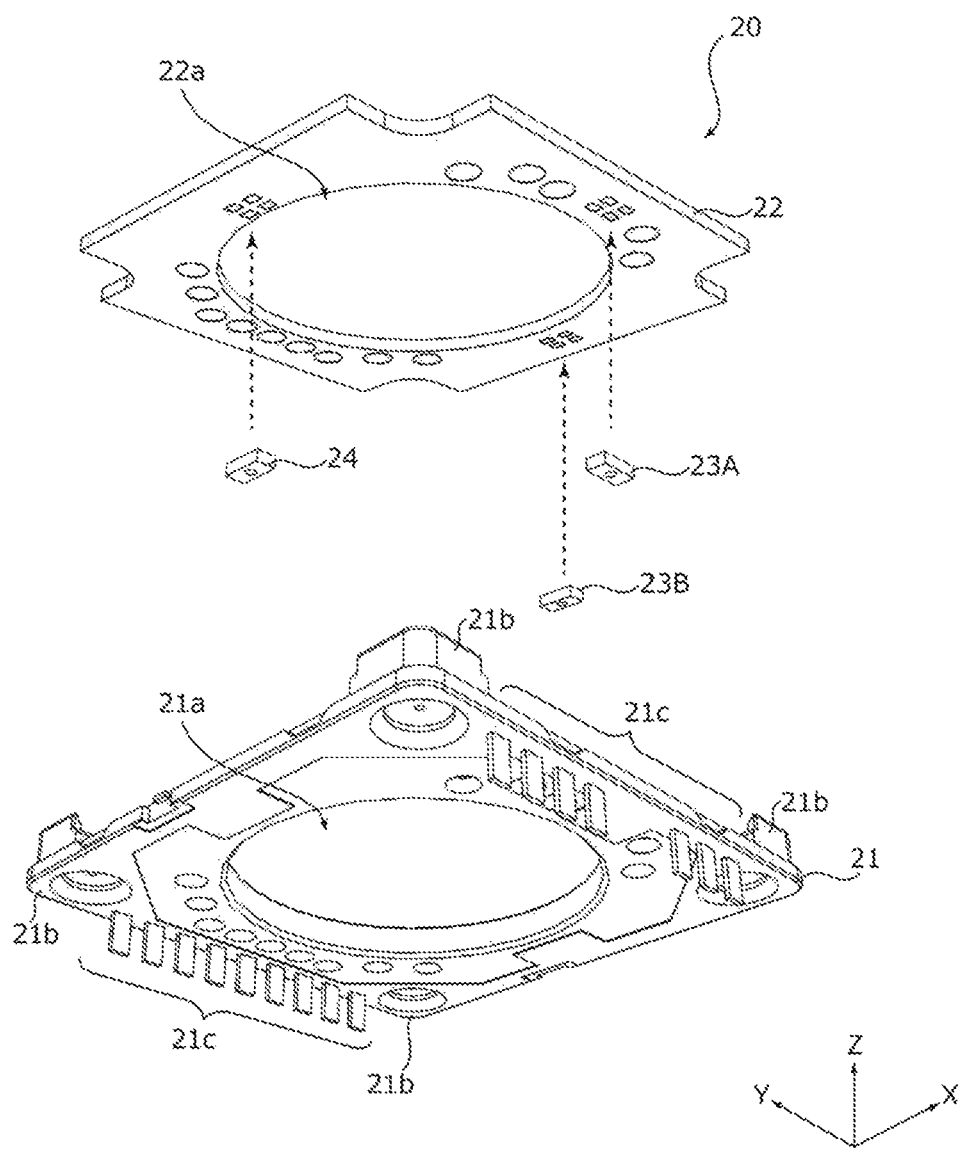
FIG. 10 is an exploded perspective view of the OIS fixing part.

FIGS. 9 and 10 are exploded perspective views of OIS fixing part 20. FIG. 9 is an upper perspective view and FIG. 10 a lower perspective view. As illustrated in FIGS. 9 and 10, OIS fixing part 20 includes base 21, coil base plate 22, OIS hall elements 23A and 23B (second hall elements), AF hall element 24, and the like.

Base 21 includes circular opening 21a at the center. In camera module A, an image sensor board (not illustrated) with an imaging device (not illustrated) mounted thereon is disposed on the image formation side in the optical-axis direction of base 21.

In the embodiment, base 21 is close to a square in a plan view. In addition, base 21 includes, at four corners, wire fixing sections 21b to which the other end of suspension wire 30 is fixed. Four corners of wire fixing sections 21b protrude to the light reception side in the optical-axis direction and each have a shape fit for an underpart of wire insertion section 121g of magnet holder 121. The other end (lower end) of suspension wire 30 is electrically connected with terminal metal fixture 21c embedded in wire fixing sections 21b by, for example, soldering.

Base 21 includes terminal metal fixture 21c integrally molded by, for example, insert molding. In the embodiment, terminal metal fixtures 21c are provided on two sides along the Y-direction, and formed inflected to the image formation side in the optical-axis direction. One end of terminal metal fixtures 21c is electrically connected with the image-sensor board (not illustrated). The other end of terminal metal fixtures 21c is electrically connected with a wiring pattern (not illustrated) of coil base plate 22 or suspension wire 30.

Base 21 includes, at a rim portion of opening 21a, hall element housings 21d to house OIS hall elements 23A and 23B and AF hall element 24, respectively.

Coil base plate 22 includes circular opening 22a at the center. OIS coils 221A, 221B, and 222 are disposed at the rim portion of opening 22a on coil base plate 22. In the embodiment, coil base plate 22 is square in a plan view in the same manner as base 21. In addition, coil base plate 22 includes, at its four corners, cutouts 22b formed in a shape fit for wire fixing sections 21b of base 21. Base 21 and coil base plate 22 are aligned by using wire fixing sections 21b of base 21 and cutouts 22b of coil base plate 22.

OIS coils 221A, 221B, and 222 are disposed at positions facing driving magnets 122A, 122B, and 123, respectively, in the optical-axis direction. OIS coils 221A and 221B are coils for moving OIS movable part 10 in the X-direction, and OIS coil 222 is a coil for moving OIS movable part 10 in the Y-direction. End of OIS coils 221A, 221B, and 222 is connected to the wiring pattern (not illustrated) of coil base plate 22 by, for example, soldering.

Sizes and arrangements of OIS coils 221A, 221B, and 222 and driving magnets 122A, 122B, and 123 are set such that magnetic fields radiated from bottom surfaces of driving magnets 122A, 122B, and 123 intersect long side portions of respective OIS coils 221A, 221B, and 222 in the optical-axis direction. Energization current flowing through OIS coils 221A, 221B, and 222 is controlled by driving control section 200 (see FIG. 11). In this way, in the embodiment, driving magnets 122A, 122B, and 123 and OIS coils 221A, 221B, and 222 constitute at least main part of the OIS voice coil motor.

Coil base plate 22 has a wiring pattern including power supply lines (not illustrated) for supplying power to OIS coils 221A, 221B, and 222, and signal lines (not illustrated) for detection signals output from OIS hall elements 23A and 23B and AF hall element 24. The wiring pattern is electrically connected to terminal metal fixture 21c of base 21 by, for example, soldering. OIS hall elements 23A and 23B and AF hall element 24 are disposed on the rear face of coil base plate 22. OIS hall elements 23A and 23B and AF hall element 24 detect a magnetic field by using Hall effect.

OIS hall elements 23A and 23B are disposed at positions that face driving magnets 122A and 123, respectively, in the optical-axis direction (see FIGS. 6A and 6B). In the embodiment, OIS hall elements 23A and 23B are disposed near respective centers of adjacent two sides on the undersurface of coil base plate 22. OIS hall elements 23A and 23B detect magnetic fields generated by driving magnets 122A and 123, and thereby the position of OIS movable part 10 in the XY plane can be identified. Furthermore, a magnet for XY position detection (second position detection magnet) may be disposed in OIS movable part 10 in addition to driving magnets 122A and 123. That is, in the embodiment, driving magnets 122A and 123 also serve as the magnet for XY position detection.

AF hall elements 24 are disposed at a position that faces Z position detection magnet 113 in the optical-axis direction (see FIG. 6A). AF hall elements 24 detects a magnetic field generated by Z position detection magnet 113, and thereby the position of AF movable part 11 in the optical-axis direction can be identified.

In the embodiment, single-pole Z position detection magnet 113 is disposed such that its magnetization direction coincides with the optical-axis direction, Z position detection magnet 113 faces AF hall element 24 in the optical-axis direction; thereby, relation between the position in the optical-axis direction and strength of the magnetic field indicates high correlation. Therefore, the position of AF movable part 11 in the optical-axis direction can be accurately calculated.

In this way, in the embodiment, AF hall element 24 is also disposed in OIS fixing part 20 in the same manner as OIS hall elements 23A and 23B. Thus, in comparison with the prior art (see PTL 1) having AF hall elements disposed on an OIS movable part, the configuration to detect the position of AF movable part 11 can be simplified. For example, in PTL 1, the OIS supporting part is made up of six suspension wires and used as not only power feeding lines to AF coils but also power feeding lines to AF hall elements and signal lines of the AF hall elements, but in the embodiment, such a configuration is unnecessary, and design freedom increases. In addition, because the structure is simplified, the AF driving section can be made thinner, and lens driving device 1 can be made shorter.

Members that are weak in impact like suspension wires can be reduced; thereby, lens driving device 1 can be improved in reliability. Furthermore, OIS hall elements 23A and 23B and AF hall element 24 can be mounted on coil base plate 22 at one step; thereby, steps required for manufacturing can be reduced.

In lens driving device 1, because one side of four sides defining a rectangle does not have driving magnets 122A, 122B or 123 disposed, lens driving device 1 is useful for use in a dual camera. By making another lens driving device neighbor to the side where none of driving magnets 122A, 122B and 123 are disposed, interference between magnets can be prevented or reduced.

Figure 11:
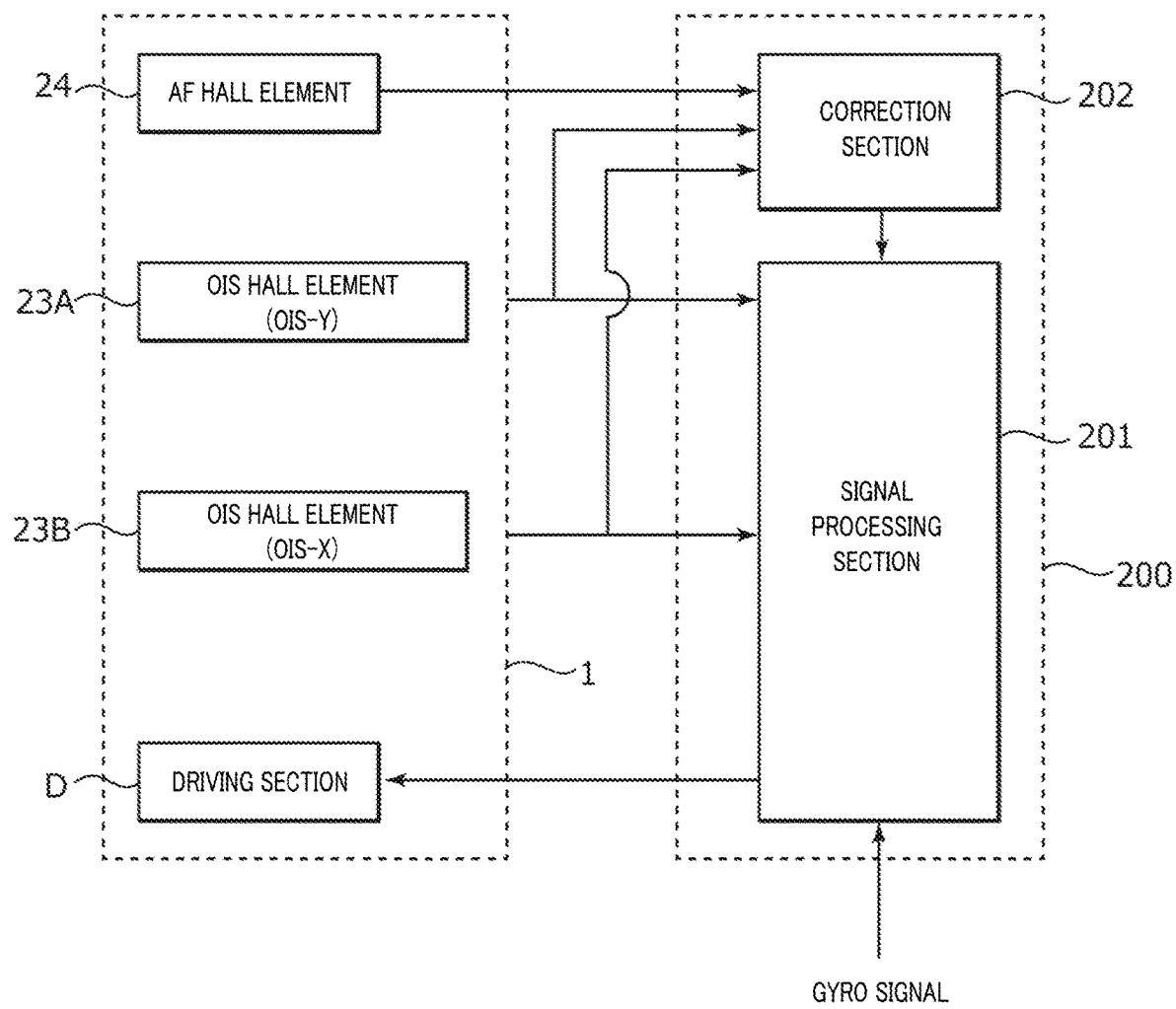
FIG. 11 is a block diagram illustrating an AF function and OIS function in the lens driving device.

FIG. 11 is a block diagram illustrating an AF function and OIS function in lens driving device 1. In FIG. 11, AF coils 112A and 112B and OIS coils 221A, 221B, and 222 are collectively referred to as "driving section D".

As illustrated in FIG. 11, the AF function and OIS function of lens driving device 1 are achieved by driving control section 200. Driving control section 200 is mounted on, for example, the image-sensor board (not illustrated). Driving control section 200 includes signal processing section 201, correction section 202, and the like. Signal processing section 201 and correction section 202 are composed of electronic circuits, for example, DSPs (Digital Signal Processors), ASICs (Application Specific Integrated Circuits), PLDs (Programmable Logic Devices), or the like.

If driving control section 200 is provided on a camera-mounted device equipped with camera module A, driving control section 200 may be composed of a computer including, for example, a CPU (Central Processing Unit) as a calculation/control apparatus, a ROM (Read Only Memory) and RAM (Random Access Memory) as main storage, and the like, and may function as signal processing section 201 and correction section 202 when the CPU executes programs.

When lens driving device 1 performs optical image stabilization, signal processing section 201 controls energization current to OIS coils 221A, 221B, and 222. Specifically, signal processing section 201 controls energization current to OIS coils 221A, 221B, and 222 so as to cancel out shake of camera module A based on a detection signal (gyro signal) from a shake detection section (not illustrated, for example, a gyro sensor). At this time, by feeding back detection results of OIS hall elements 23A and 23B, swaying of OIS movable part 10 can be accurately controlled.

When OIS coils 221A, 221B, and 222 are energized, a Lorentz force is generated at OIS coils 221A, 221B, and 222 (Fleming's left-hand rule) by interaction between the magnetic fields by driving magnets 122A, 122B, and 123 and currents flowing through OIS coils 221A, 221B, and 222. The direction of the Lorentz force is the direction (Y-direction or X-direction) orthogonal to the direction of the magnetic fields (Z-direction) and to the direction of the currents (X-direction or Y-direction) at the long side portions of OIS coils 221A, 221B, and 222. Since OIS coils 221A, 221B, and 222 are fixed, reactive force acts on driving magnets 122A, 122B, and 123. With this reaction force serving as the driving force of the OIS voice coil motor, OIS movable part 10 including driving magnets 122A, 122B, and 123 sways in the XY plane, so that optical image stabilization is carried out.

When lens driving device 1 carries out auto-focusing, signal processing section 201 controls energization current to AF coils 112A and 112B. Specifically, signal processing section 201 controls energization current to AF coils 112A and 112B based on detection results from AF hall element 24. At this time, in the embodiment, correction section 202 corrects detection results of AF hall element 24 based on detection results from OIS hall elements 23A and 23B. An AF control process in lens driving device 1 is explained in concrete terms below with reference to FIG. 12.

Figure 12:
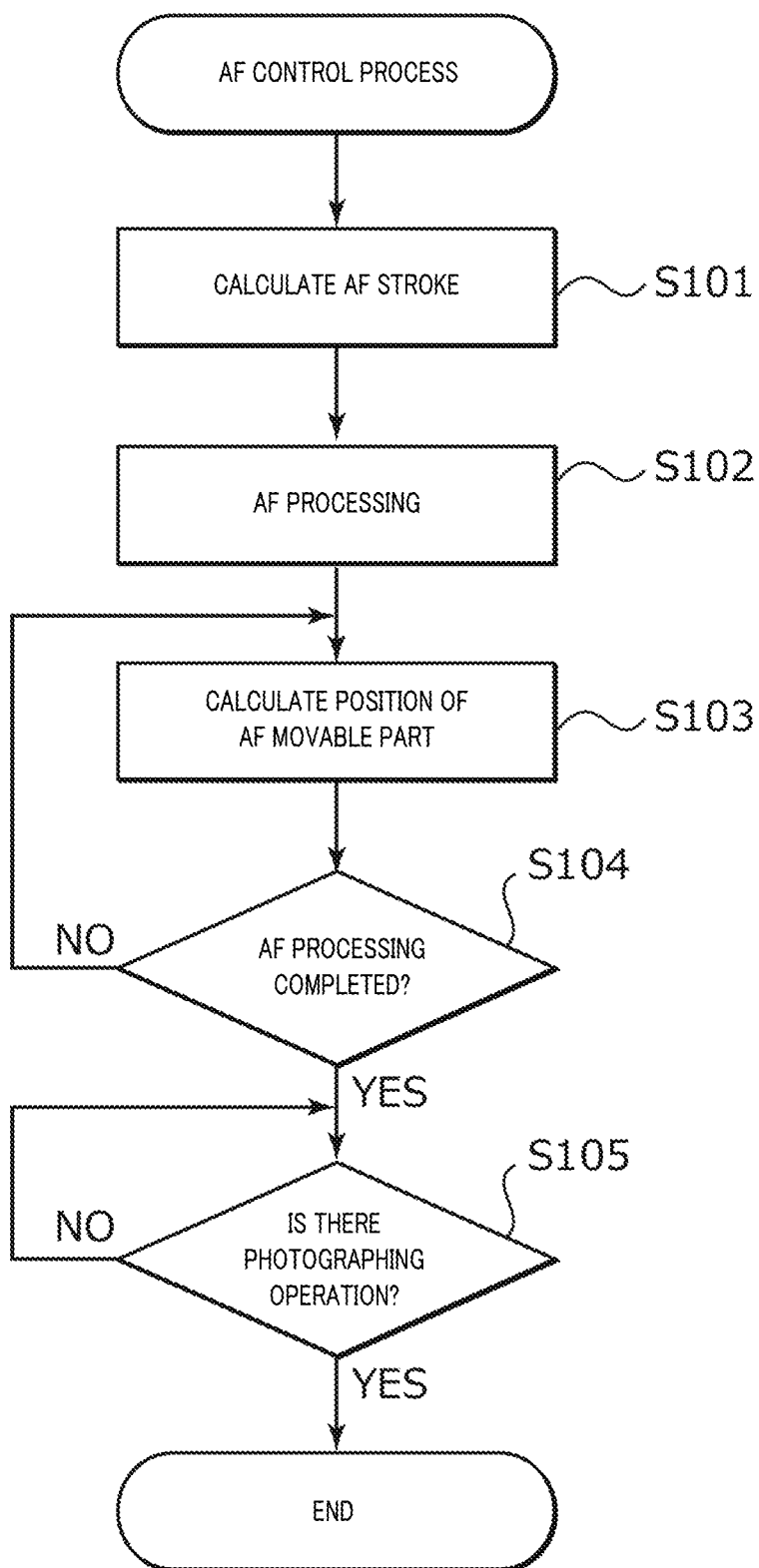
FIG. 12 is a flowchart illustrating an example of an AF control process in the lens driving device.

FIG. 12 is a flowchart illustrating an example of the AF control process in lens driving device 1. The flowchart illustrated in FIG. 12 is executed by driving control section 200, for example, in response to photographing preparation operation (for example, half-pressing operation of a shutter button) at smart phone M.

At step S101 in FIG. 12, driving control section 200 calculates an AF stroke for autofocus based on a subject image captured by the imaging device (not illustrated) (function as signal processing section 201). For calculation of the AF stroke, for example, an imaging surface phase difference autofocus system is applicable.

At step S102, driving control section 200 controls energization current to AF coils 112A and 112B so as to move AF movable part 11 by the AF stroke calculated at S101 as an AF process (function as signal processing section 201).

When AF coils 112A and 112B are energized, the Lorentz force is generated in AF coils 112A and 112B due to interaction between magnetic fields by driving magnets 122A and 122B and current flowing through AF coils 112A and 112B. The direction of the Lorentz force is a direction (Z-direction) orthogonal to the direction of the magnetic fields (X-direction or Y-direction) and the direction of the current flowing through AF coils 112A and 112B (Y-direction or X-direction). Because driving magnets 122A and 122B are fixed, reactive force occurs to AF coils 112A and 112B. The reaction force serves as driving force of the AF voice coil motor, and AF movable part 11 including AF coils 112A and 112B moves in the optical-axis direction, and focusing is carried out.

At step S103, driving control section 200 calculates the position of AF movable part 11 in the optical-axis direction based on detection results from AF hall element 24 and OIS hall elements 23A and 23B (processing as signal processing section 201 and correction section 202). Specifically, driving control section 200 calculates the XY position of OIS movable part 10 based on output from OIS hall elements 23A and 23B. Driving control section 200 then corrects output from AF hall element 24 (see FIG. 13A) based on the XY position of OIS movable part 10 (see FIGS. 13B and 13C). This allows the position of AF movable part 11 in the optical-axis direction to be accurately calculated. At this time, if Z position detection magnet 113 is cylindrical like the embodiment, correction processing can be simplified by converting the XY position of OIS movable part 10 into a radius and representing it as displacement from the reference position.

Figure 13A:
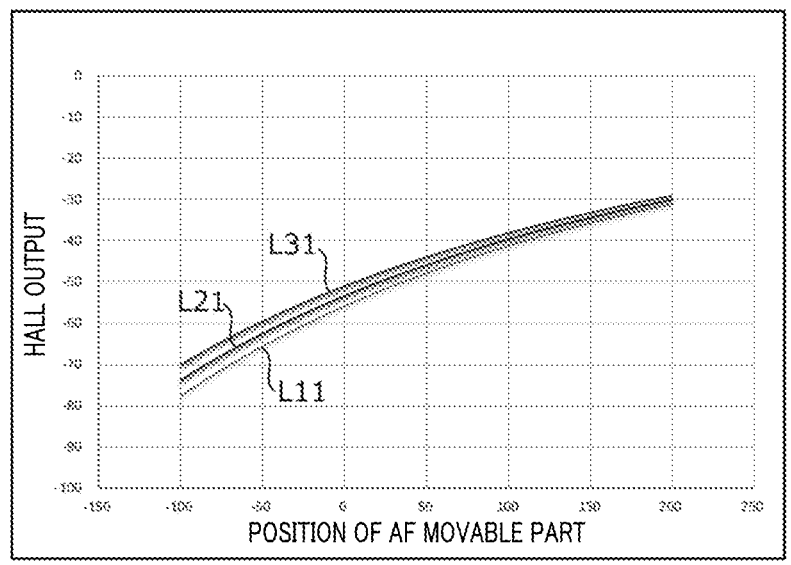
FIGS. 13A-13C are diagrams illustrating a correction process in a driving control section.

FIG. 13A indicates relation between the position of AF movable part 11 in the optical-axis direction and the output of AF hall element 24 (hereinafter referred to as "hall output"). The position of AF movable part 11 in the optical-axis direction can take a value within a range between −100 μm where AF movable part 11 is situated closest to the image formation side in the optical-axis direction and +200 μm where it is situated closest to the light reception side in the optical-axis direction. In FIG. 13A, L11 denotes the hall output where OIS movable part 10 is at the reference position, L21 the hall output where displacement of OIS movable part 10 from the reference position is 120 μm, and L31 the hall output where displacement of OIS movable part 10 from the reference position is 170 μm.

As illustrated in FIG. 13A, the hall output gets smaller as AF movable part 11 (Z position detection magnet 113) draws apart from AF hall element 24. In addition, an error from hall output L11 serving as the reference gets larger as displacement of OIS movable part 10 gets larger.

Figure 13B:
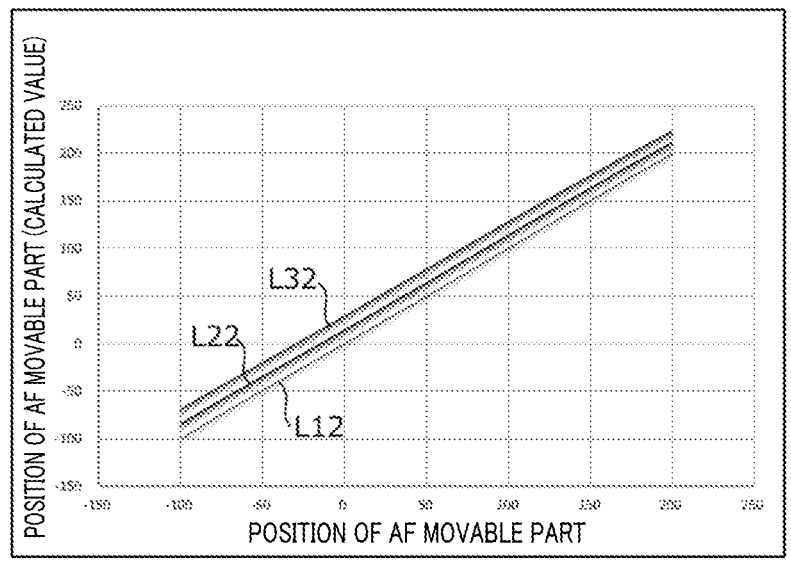

FIG. 13B indicates relation between the position of AF movable part 11 and the position of AF movable part 11 calculated based on the hall output (hereinafter referred to as "first detection position"). The hall output here is a value after correction so that the relation indicated in FIG. 13A has linearity. In FIG. 13B, L12 denotes the first detection position where OIS movable part 10 is at the reference position, L22 the first detection position where displacement of OIS movable part 10 from the reference position is 120 μm, and L32 the first detection position where displacement of OIS movable part 10 from the reference position is 170 μm.

As illustrated in FIG. 13B, an error from first detection position L21 serving as the reference gets larger as displacement of OIS movable part 10 gets larger. By making correction such that the hall output has linearity, an error where displacement is the same becomes constant regardless of the position of AF movable part 11. In other words, if displacement of OIS movable part 10 is the same, the same value can be used as a correction value to correct an error.

Figure 13C:
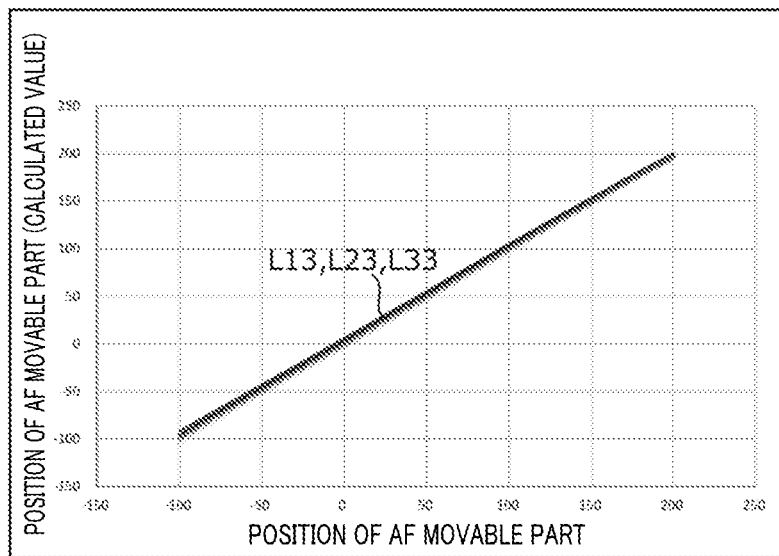

FIG. 13C indicates relation between the position of AF movable part 11 and the position of AF movable part 11 calculated based on the hall output and the displacement of OIS movable part 10 (hereinafter referred to as "second detection position"). In FIG. 13C, L13 denotes the second detection position where OIS movable part 10 is at the reference position, L23 the second detection position where the displacement of OIS movable part 10 from the reference position is 120 μm, and L33 the second detection position where the displacement of OIS movable part 10 from the reference position is 170 μm.

As illustrated in FIG. 13C, by making correction using the correction value obtained from FIG. 13B, even if OIS movable part 10 is displaced, the position of AF movable part 11 in the optical-axis direction can be accurately calculated. Thus, the position of AF movable part 11 in the optical-axis direction is calculated (step S103 in FIG. 12).

At step S104 in FIG. 12, driving control section 200 compares the calculated position of AF movable part 11 in the optical-axis direction with the position moved by the AF stroke, and determines whether the AF process is completed. If the AF process is completed (YES at step S104), the process proceeds to step S105. If the AF process is not completed (NO at step S104), the process goes back to step S103.

In other words, in the AF process, closed loop control is maintained based on detection signals from AF hall element 24 and OIS hall elements 23A and 23B. The closed loop control system does not need to take into consideration hysteresis characteristics of the voice coil motor, and on top of that can directly detect stability of the position of AF movable part 11. Therefore, its response performance is high and the AF operation can be accelerated.

At step S105, driving control section 200 determines whether photographing operation (for example, full-pressing operation of the shutter button) is conducted at smart phone M. When photographing operation is conducted (YES at step S105), the imaging device (not illustrated) captures a subject image, and the AF control process ends. In addition, if it gets out of focus before photographing operation, the process of steps S101-S104 is executed again. As stated above, the AF control process is executed.

In the embodiment, at the time of no energization current when the AF process is not executed, AF movable part 11 is in a state of being suspended between the infinity position and the macro position (hereinafter referred to as "reference state") by upper springs 13A and 13B and lower spring 14. In other words, in OIS movable part 10, AF movable part 11 (lens holder 111) is elastically supported in a displaceable manner toward both sides in the Z-direction in a state of being positioned with respect to AF fixing part 12 (magnet holder 121) by upper springs 13A and 13B and lower spring 14.

In the AF process, direction of current is controlled depending on whether AF movable part 11 is moved from the reference state to the macro position side or to the infinity position side. Furthermore, the magnitude and/or energization time of current is controlled according to movement distance of AF movable part 11.

In this way, lens driving device 1 includes: the AF driving section that includes AF coils 112A and 112B disposed at the periphery of lens part 2 and driving magnets 122A and 122B (auto-focusing magnets) disposed radially spaced apart from AF coils 112A and 112B, and that moves AF movable part 11 including AF coils 112A and 112B in the optical-axis direction with respect to AF fixing part 12 including driving magnets 122A and 122B; and optical image stabilization driving section that includes driving magnets 122A, 122B, and 123 (optical image stabilization magnets) disposed in the AF driving section and optical image stabilization coils 221A, 221B, and 222 disposed spaced apart from optical image stabilization magnets 122A, 122B, and 123 in the optical-axis direction, and that sways OIS movable part 10 (optical image stabilization movable part) including the AF driving section and driving magnets 122A, 122B, and 123 in the plane orthogonal to the optical-axis direction with respect to OIS fixing part 20 (optical image stabilization fixing part) including optical image stabilization coils 221A, 221B, and 222.

AF movable part 11 includes Z position detection magnet 113 (first position detection magnet), and OIS fixing part 20 includes AF hall element 24 provided facing Z position detection magnet 113 in the optical-axis direction.

Lens driving device 1 does not need to use suspension wire 30 or the like as a power feeding line and signal line of AF hall element 24, thereby can simplify the configuration to detect the position of AF movable part 11 in the optical-axis direction, and improve the reliability of the AF driving section.

Hereinbefore, the invention made by the inventor is specifically explained based on the embodiment, but the invention is not limited to the above-described embodiment and can be modified within a range not deviating from the substance.

For example, the embodiment is explained by taking a smart phone which is a mobile terminal with a camera as an example of a camera-mounted device equipped with camera module A, but the present invention is applicable to a camera-mounted device including a camera module and an image processing section to process image information obtained by the camera module. The camera-mounted device includes an information device and transporting device. The information device includes, for example, a mobile phone with a camera, laptop computer, tablet terminal, portable game machine, web camera, and an on-vehicle device with a camera (for example, back monitor apparatus and drive recorder). On the other hand, the transporting device includes, for example, an automobile.

Figure 14A:
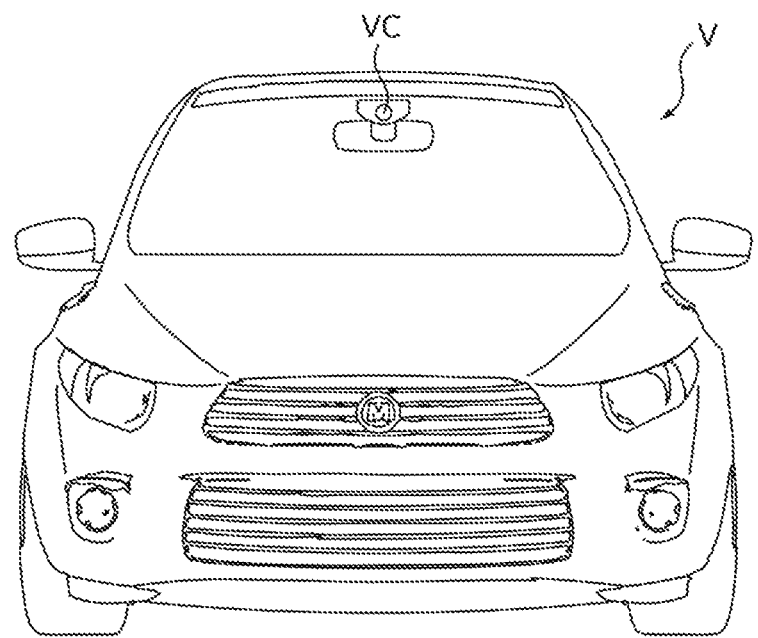
FIGS. 14A and 14B illustrate an automobile as a camera-mounted device equipped with an on-vehicle camera module.
Figure 14B:
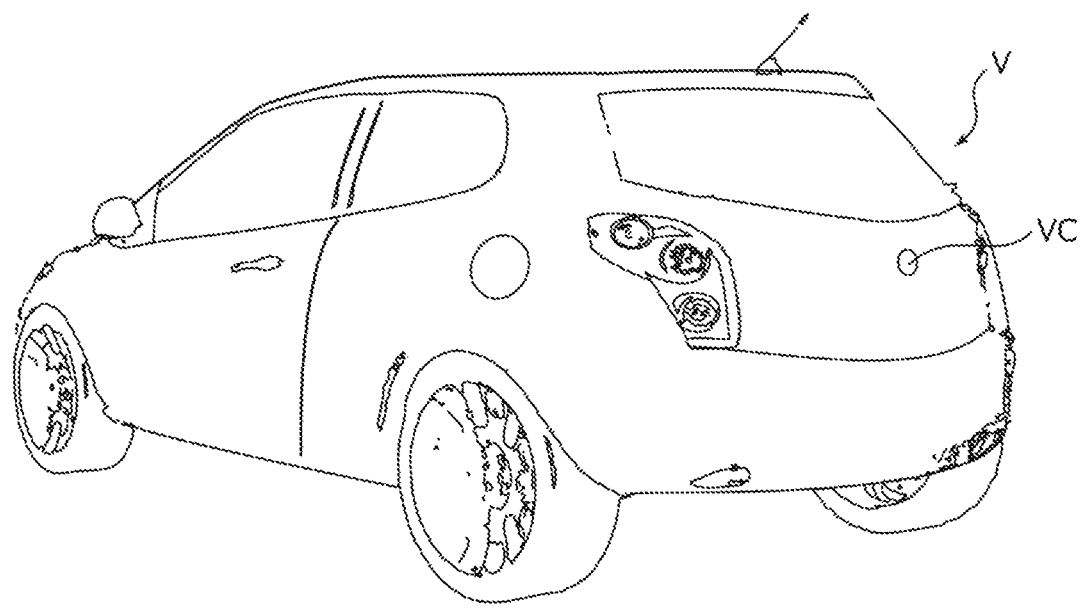

FIGS. 14A and 14B are diagrams illustrating automobile V as an camera-mounted device equipped with on-vehicle camera module VC (Vehicle Camera). FIG. 14A is a front view of automobile V and FIG. 14B a backward perspective view of automobile V. Automobile V is equipped with camera module A explained in the embodiment as on-vehicle camera module VC. As illustrated in FIG. 14, on-vehicle camera module VC is attached to, for example, a windshield directing its camera toward the front and a rear gate directing the camera toward the back. On-vehicle camera module VC is used for a back monitor, drive recorder, collision avoidance control, self-driving control, or the like.

The invention is applicable to a lens driving device in which the AF coils are disposed along the outer peripheral face of the lens holder such that its coil plane is orthogonal to the optical-axis direction and the driving magnets are disposed at the periphery of the AF coils. That is, configurations of the AF voice coil motor and OIS voice coil motor of the invention are not limited to those indicated in the embodiment.

As OIS supporting part, instead of suspension wire 30 indicated in the embodiment, for example, an elastic supporting member composed of elastomer or the like can be applied. In this case, power to the AF coil may be supplied using a flexible printed circuit board or litz wires.

The invention has a possibility of also being applicable to a lens driving device having only the AF function without the OIS function. In this case, the lens driving device may adopt a moving coil system in which the coils are disposed in the AF movable part or a moving magnet system in which the magnets are disposed in the AF movable part.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

REFERENCE SIGNS LIST

1 Lens driving device
2 Lens part
3 Cover
10 OIS movable part (AF driving section)
11 AF movable part
12 AF fixing part
13 AF supporting part
13A, 13B Upper spring
14 AF supporting part, Lower spring
20 OIS fixing part
21 Base
22 Coil base plate
23A, 23B OIS hall element (second hall element)
24 AF hall element (first hall element)
30 OIS supporting member, suspension wire
111 Lens holder
112A, 112B AF coil
113 Z position detection magnet (first position detection magnet)
121 Magnet holder
122A, 122B Driving magnet (AF magnet cum OIS magnet)
123 Driving magnet (OIS magnet)
124 Counter weight
221A, 221B, 222 OIS coil
M Smart phone
A Camera module

The invention claimed is:

1. A lens driving device, comprising:
an autofocus driving section including an auto-focusing coil to be disposed at a periphery of a lens part and an auto-focusing magnet to be disposed radially spaced apart from the auto-focusing coil, the autofocus driving section being configured to move an autofocus movable part including the auto-focusing coil in an optical-axis direction with respect to an autofocus fixing part including the auto-focusing magnet; and
an optical image stabilization driving section including an optical image stabilization magnet to be disposed in the autofocus driving section and an optical image stabilization coil to be disposed spaced apart from the optical image stabilization magnet in the optical-axis direction, the optical image stabilization driving section being configured to sway an optical image stabilization movable part including the autofocus driving section and the optical image stabilization magnet in a plane orthogonal to the optical-axis direction with respect to an optical image stabilization fixing part including the optical image stabilization coil,
wherein the autofocus movable part includes a first position detection magnet, and wherein the optical image stabilization fixing part includes a first hall element to be provided facing the first position detection magnet in the optical-axis direction.

2. The lens driving device according to claim 1, wherein the first position detection magnet is a single-pole magnet and disposed such that a magnetization direction coincides with the optical-axis direction.

3. The lens driving device according to claim 2, wherein the first position detection magnet is cylindrical.

4. The lens driving device according to claim 1, wherein:
the auto-focusing magnet and the optical image stabilization magnet are disposed along sides excluding particular one side among four sides defining a rectangle; and
the first position detection magnet is disposed on the particular one side.

5. The lens driving device according to claim 4, wherein the first position detection magnet is disposed near a center in a longitudinal direction of the particular one side.

6. The lens driving device according to claim 4, wherein the optical image stabilization movable part includes a counter weight for stabilizing a horizontal attitude in the plane orthogonal to the optical-axis direction.

7. The lens driving device according to claim 6, wherein the counter weight is disposed on the particular one side.

8. The lens driving device according to claim 1, wherein:
the optical image stabilization movable part includes a second position detection magnet, and
the optical image stabilization fixing part includes a second hall element to be provided facing the second position detection magnet in the optical-axis direction.

9. The lens driving device according to claim 8, wherein the optical image stabilization magnet serves as the second position detection magnet.

10. A camera module, comprising:
the lens driving device according to claim 1;
a lens part to be mounted in the autofocus movable part; and
an image capturing part configured to capture a subject image formed by the lens part.

11. The camera module according to claim 10, further comprising
a driving control section configured to control driving of the autofocus driving section based on output from the first hall element and a second hall element.

12. A camera-mounted device that is an information device or a transporting device, the camera-mounted device comprising:
the camera module according to claim 10; and
an image processing section configured to process image information obtained by the camera module.

* * * * *